(12) United States Patent
Daub

(10) Patent No.: US 10,348,862 B2
(45) Date of Patent: Jul. 9, 2019

(54) LOST ITEM RETRIEVAL VIA A COMMUNICATION NETWORK

(71) Applicant: Sally Jean Daub, Toronto (CA)

(72) Inventor: Sally Jean Daub, Toronto (CA)

( * ) Notice: Subject to any disclaimer, the term of this patent is extended or adjusted under 35 U.S.C. 154(b) by 226 days.

(21) Appl. No.: 15/426,782

(22) Filed: Feb. 7, 2017

(65) Prior Publication Data

US 2018/0227393 A1    Aug. 9, 2018

(51) Int. Cl.
*G06F 15/16* (2006.01)
*H04L 29/06* (2006.01)
*H04L 29/08* (2006.01)
*H04L 12/58* (2006.01)

(52) U.S. Cl.
CPC ............. *H04L 67/42* (2013.01); *H04L 51/24* (2013.01); *H04L 67/18* (2013.01); *H04L 67/20* (2013.01); *H04L 67/22* (2013.01); *H04L 51/20* (2013.01)

(58) Field of Classification Search
CPC .......... H04L 67/42; H04L 51/24; H04L 67/18
USPC ........................................................ 709/203
See application file for complete search history.

(56) References Cited

U.S. PATENT DOCUMENTS

| | | | |
|---|---|---|---|
| 9,569,950 B1* | 2/2017 | Will | H04M 3/493 |
| 2004/0019609 A1* | 1/2004 | Orton, III | G06Q 10/10 |
| 2010/0007500 A1* | 1/2010 | Mestres | G06Q 10/08 |
| | | | 340/572.4 |

* cited by examiner

*Primary Examiner* — Frantz B Jean
(74) *Attorney, Agent, or Firm* — Garlick & Markison; Bruce E. Stuckman

(57) ABSTRACT

A lost and found server includes a processor that executes a lost and found server application that bidirectionally communicates item retrieval data with a plurality of client devices to generate lost item alert data automatically in response to receiving lost item selection data from a first client device for transmission to a proximity-based proper subset of client devices. These client devices automatically display a lost item alert on corresponding display devices. A found item notification data is received from a second client device associated with a user that found the lost item based on user input to a second client device. Found item alert data is generated automatically in response to receiving the found item notification data for transmission to the first client device. The first client device automatically displays a found item alert on the first display device indicating that the first lost item was found.

20 Claims, 14 Drawing Sheets

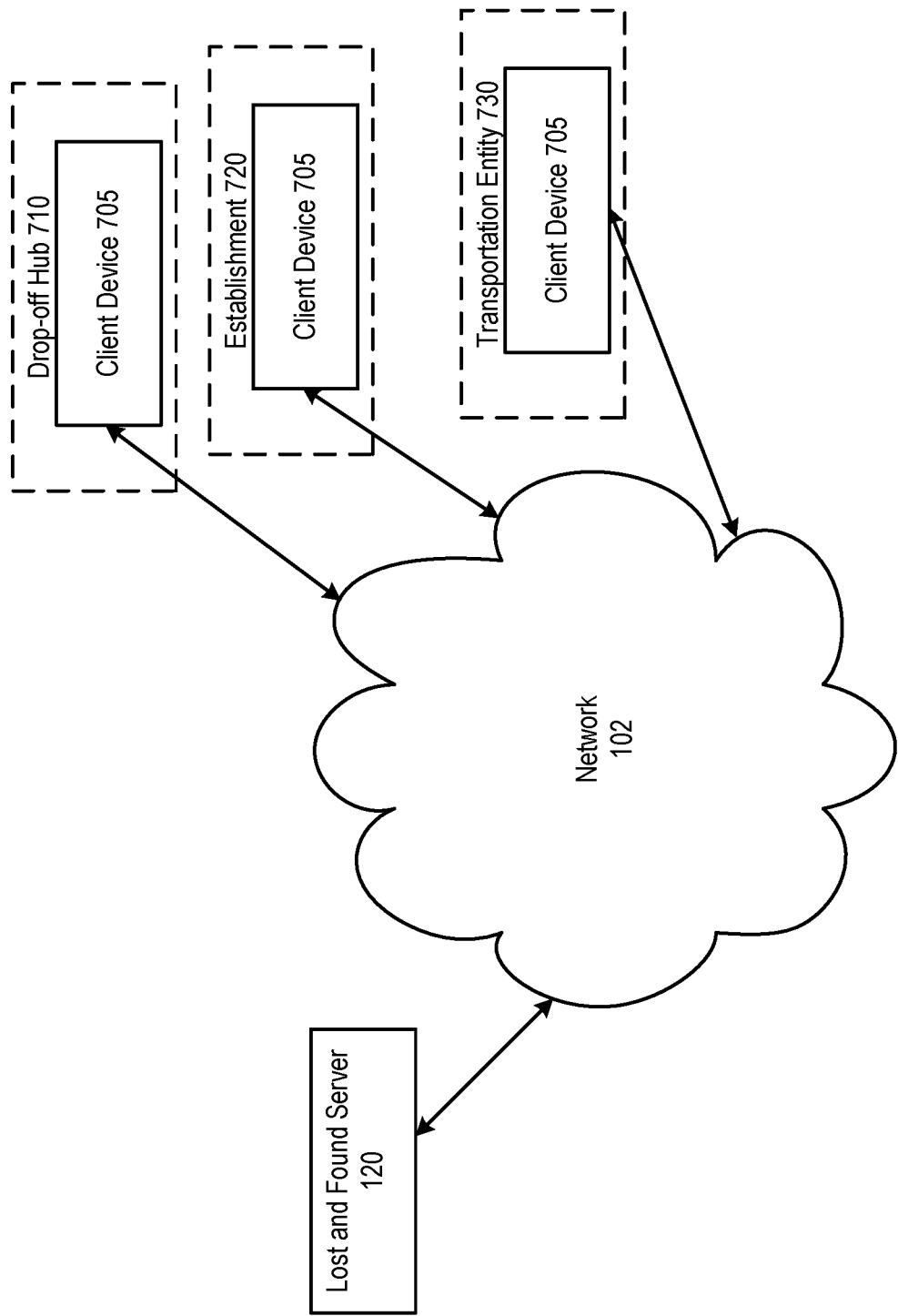

LOST ITEM RETRIEVAL VIA A COMMUNICATION NETWORK

CROSS-REFERENCE TO RELATED APPLICATIONS

None

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to knowledge based systems used in conjunction with client/server network architectures of a communication network.

BRIEF DESCRIPTION OF THE SEVERAL VIEWS OF THE DRAWING(S)

FIG. 7 is a schematic block diagram of an embodiment of the present invention.

DETAILED DESCRIPTION OF THE INVENTION

Figure 1:
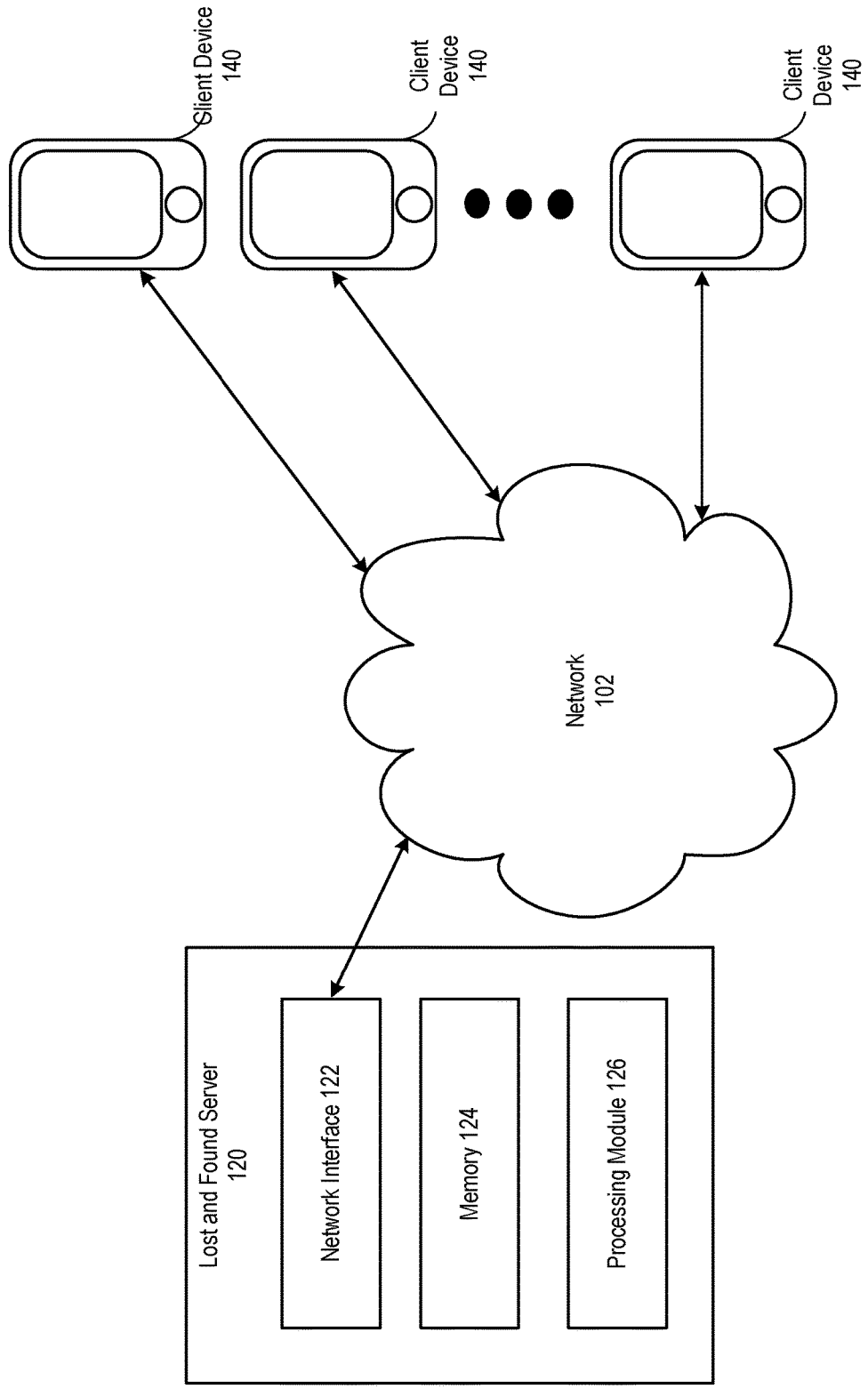
FIG. 1 is a schematic block diagram of an embodiment of the present invention.

FIG. 1 is a schematic block diagram of an embodiment of the present invention that includes a Lost and Found server 120 and a plurality of client devices 140. The Lost and Found server 120 can include a network interface 122, a memory 124, and a processing module 126. The plurality of client devices can include one or more mobile devices and/or one or more personal computers. The Lost and Found server 120 and the plurality of client devices 140 are coupled to a network 102, which may include one or more wireless and/or wire lined communication systems; one or more non-public intranet systems and/or public internet systems; and/or one or more local area networks (LAN) and/or wide area networks (WAN) including the Internet. The network interface 122 can more support one or more communication links via the network 102 indirectly and/or directly.

Currently, if one wishes to employ the help of others to retrieve a lost item, they might post a physical notice of the lost item to bulletin boards and post virtual notices to web forums. However, current methods of requesting the help of others to locate a lost item require that such people stumble upon, or even specifically search for, the notice that the item was lost. The present application introduces an enhanced lost and found system by utilizing a server/client network architecture. In various embodiments of the present invention, users subscribed to the system are immediately notified automatically via a client device such as a personal computer or mobile phone. Furthermore, the subset of users that are notified are selected based on current locations of the users in the system based on, for example, geospatial data such as GPS data associated with the client device. This allows users to be immediately notified when a lost item has been reported nearby. Furthermore, item retrieval is facilitated by providing, for example, bidirectional communication between the owner of a lost item and a user that found the item.

More particularly, the Lost and Found server 120 presents a website that can operate via a browser application of client device 140 or via an application stored in a memory of the client device 140 to present a Lost and Found system via the Internet that allows a user of the system to report a lost item with descriptive information and location information via user input to a user interface displayed on the client device. The operation of the Lost and Found server 120 via the Internet supports the operation of many enhanced functions and features that were not available in a pre-Internet world. For example, other users of the system can be automatically notified via a notification displayed on their client device 140 of a new lost item reported in range of their position. The processing module can be utilized to select a proximity-based proper subset of client devices to receive the notification based on geospatial data associated with each client device 140, which can include, for example, Global Positioning System (GPS) data and/or a position derived by triangulating its location based on nearby cell towers and/or Wi-Fi hotspots. A user that finds a lost item in response to receiving such a lost item notification can be prompted through a series of steps via a user interface displayed on their client device 140 to facilitate delivery of the found item back to its owner, who is likewise prompted through a series of steps to retrieve of the lost item. Memory 124 can be utilized to store a plurality of lost item reports, a plurality of found item reports, and/or a plurality of user accounts corresponding to users registered with the system, wherein each user account can include registered client devices of the user, current location of the user based on location data received from the associated client device, contact information of the user, a photo of the user, history of items lost and/or found by the users, user preferences including alert preferences, and/or other information associated with the user. These features, as well as additional novel embodiments of the present invention that will be described below, provide many drastic improvements to the process of finding and retrieving lost items.

Figure 2:
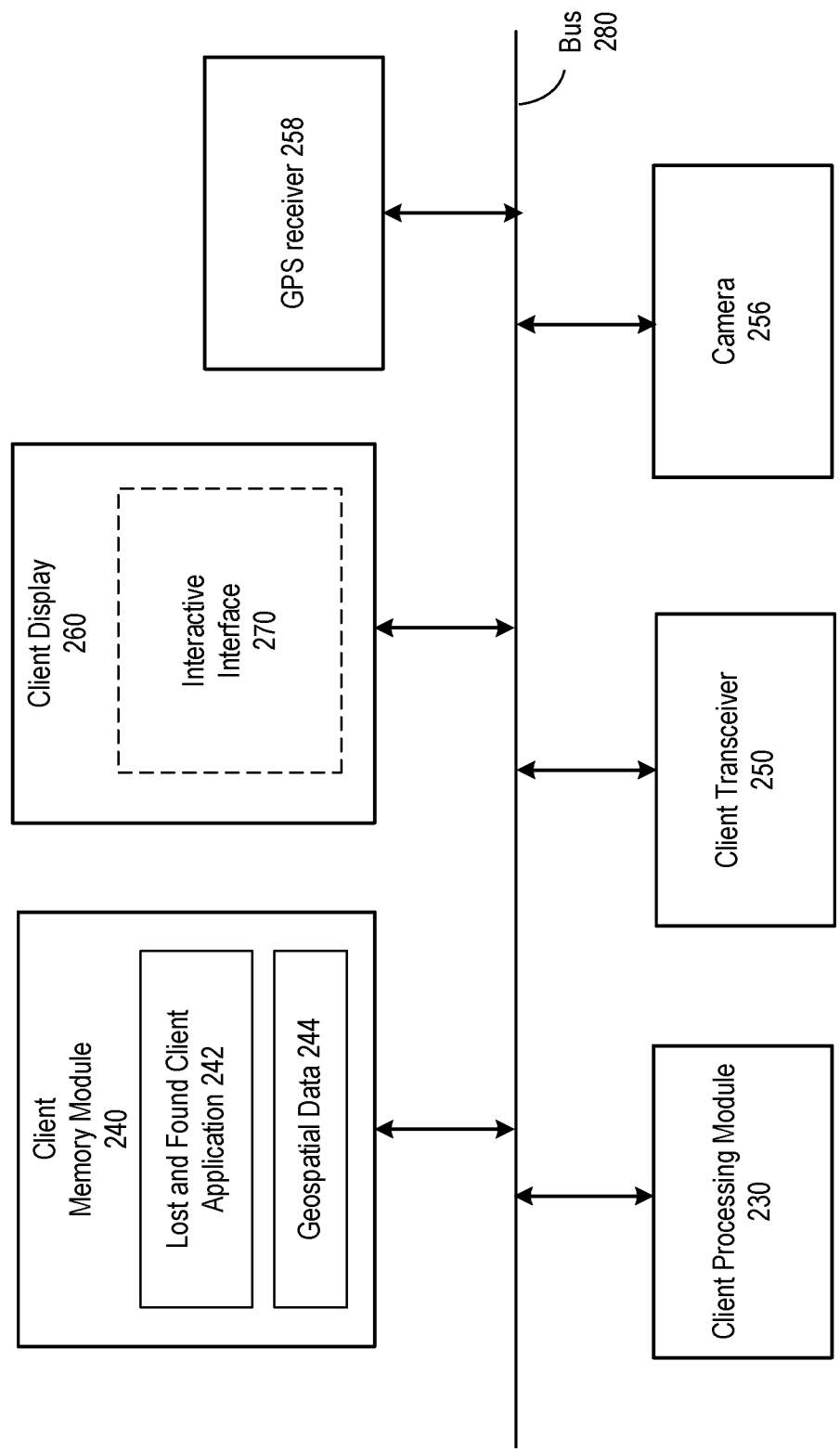
FIG. 2 is a schematic block diagram of a client device used in various embodiments of the present invention.

FIG. 2 is a schematic block diagram of a client device 140 used in various embodiments of the present invention. Each client device can be implemented utilizing a personal computer and/or mobile device. The client device can include its own client processing module 230, client memory module 240, client transceiver 250, all coupled via bus 280. An interactive interface 270 can be displayed via a display device coupled to the client device via bus 280, such as client display 260, and can interact with the interface via user input to the client device via a touch screen, keyboard, and/or one or more buttons. The user interface can be displayed in conjunction with a Lost and Found client application 242 that can be stored in the memory 240 of the client device that provides user interaction with the Lost and Found server 120 and/or the user can interact with a client application via a web browser stored in the memory of the client device. Transceiver 250 can be coupled to network 102, allowing the client device can transmit and receive communication to and from the Lost and Found server 120. Each client device can correspond to a user of the system, and the interactive interface 270 can be used to communicate notifications to and receive user input from the corresponding user in conjunction with the present invention. In various embodiments, at least one camera 256 is coupled to the client device via bus 280 for use, for example in conjunction with a camera application stored in the memory of the client device. In various embodiments, the client device can store geospatial data 244 in the memory 240. This geospatial data 244 can be generated via user interaction with the interactive interface 270, via an optional Global Positioning System (GPS) receiver 258 or gathered via a wireless network, which can include network 102, such as triangulation data received from a 4G network, location information from a connected access point or base station, femtocell or other location data. In various embodiments, the location data can be stored in conjunction with other applications, such as map applications or navigation applications, stored in the memory 240.

Figure 3:
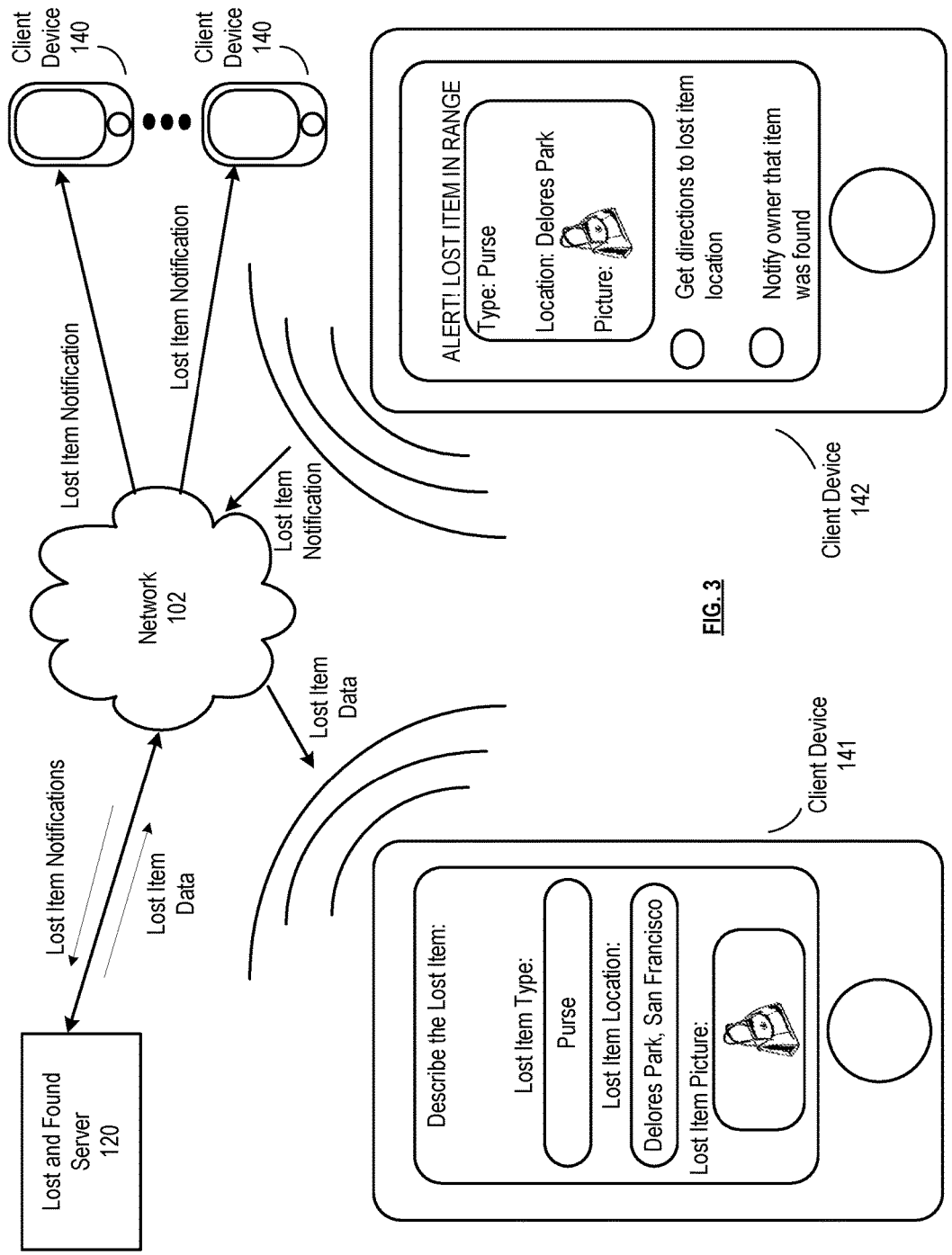
FIG. 3 is a schematic block diagram of an embodiment of the present invention.

FIG. 3 is a schematic block diagram of an embodiment of the present invention, illustrating the reporting of a lost item by a user of the system via their corresponding client device 141, and the automatic transmission of alerts to a plurality of nearby client devices, including client device 142. Client devices 141 and 142 can be included in the plurality of client devices described in conjunction with FIGS. 1 and 2, and hereafter client device 141 corresponds one of the plurality of client devices corresponding to a user reporting a lost item, and client device 142 corresponds to one of the plurality of client devices corresponding to a user reporting an item as found. In various embodiments, a user of the system will be prompted to choose whether they wish to report a lost item or report a found item. For example, consider a user that realizes that she left her purse at a restaurant approximately 30 minutes ago. This user can choose to report the purse as lost via their client device 141, for example a mobile device associated with the user. The system can then prompt this user to provide a descriptive details and location details to aid other users in finding the item via a series of questions, menu options, and/or text fields of a user interface. For example, the user can choose a purse icon from a menu of icons corresponding to item types, provide a written description that the purse is "a Chanel, purple leather cross-body" purse, and/or provide a photo corresponding to the lost purse. To provide a photo, the user can be directed to a photo library and/or social media application stored on the client device to select a photo of the item that was perhaps taken previously that is either stored on the mobile device, on a cloud application associated with the user, a social media site or a general website. For example, the user may select an Instagram photo of herself wearing the purse. The user can also be directed to a web search of images, for example, based on a brand name or description provided, and can select, for example, a retail photo of the lost item. The user can then provide lost item location details by entering one or more coordinates, addresses, regions, establishments, and/or routes a text field or via an interactive map display to indicate a known or guessed one or more locations corresponding to where the item may have been lost and/or where the item was last seen. The user can also be prompted to provide descriptive details such as "left in back corner booth" or "hanging in third stall of Women's restroom."

In various embodiments, after entering the description and location details, the details can be included in a transmission to the Lost and Found server 120. In response to receiving this lost item notification, the Lost and Found server 120 can generate an alert for transmission to a selected a subset of users of the system. For example, the Lost and Found server 120 can select a subset users based on the client device geospatial data 244 indicating that these users are located inside or in proximity to the address or location region associated with the lost item. The Lost and Found server 120 can retrieve this location information by generating a request to all users in the system for a current location generated by the client device to be transmitted back to the Lost and Found server 120, or use a most recent location received from client devices associated with each user, for example, sent by each client device at fixed or other intervals. Upon receiving this lost item alert from the Lost and Found server 120, the selected users within range of the lost item can be automatically notified via an alert displayed on the client that a lost item is nearby. In various embodiments, these recipients can be prompted to select an option to view the details associated with the lost item such as the specific description or location details.

In some embodiments, where the exact location of the lost item is unknown, the lost item location details entered by the user can include a location range and/or region. For example, this region can be determined by also prompting the user to provide a radius. In various embodiments, for example, if the item was very recently misplaced, the user can select an option to use their current location based on geospatial data 244. In various embodiments, the user can also be prompted to provide time information for example, by providing a time an item was lost or by an amount of elapsed time since the item was lost. This can be used, for example, to automatically generate a distance range associated with the user's current position or an entered address or location, or to provide the user with suggested region and/or radius options. In various embodiments, rather than utilizing a radius and centric location to determine the region, non-circular regions can be selected. For example, the user can manually select a region on an interactive map display by, for example, indicating a region perimeter, indicating one or more cross street intersections, selecting one or more buildings, etc. The user can also select a first location and a second location, for example, to indicate that the item was last seen at the first location, and that the user realized it was misplaced upon arriving at the second location. For example, the user can indicate that the item was last seen at a bus stop, and that they realized the item was lost at their current location. In this case, the region can be determined automatically as a route between these endpoints. In various embodiments, the user can select this route manually based on the route taken by the user, and can enter intermediate locations, for example, indicating that they stopped at a Starbucks at the corner after leaving the bus stop, and that they crossed through Golden Gate Park rather than walking along the street. In various embodiments, instead of or in addition to entering a first location, the user can enter an amount of time elapsed and direction traveled since losing the item, for example, indicating that the item was lost 10 minutes ago and that they have been walking east along Lombard street, and the first location can be estimated based on a geospatial data 244 of the client device, estimated walking pace, and direction of travel.

In various embodiments, the location data can include multiple separate locations where the lost item may have been left behind. For example, after a long day of errand running, a user might determine that their jacket was left in either the department store, the grocery store, the post office, or the coffee shop. If the user drove their own personal vehicle, and at the end of the day determined that the jacket was not left in the vehicle, the user may be reasonably certain that the jacket was left at one of these establishments, and not in transit between them. Thus, in scenarios such as these, using the region or route method discussed previously. A user may be prompted to enter multiple non-contiguous locations where the item may have been left, again by entering an address or interacting with a map display.

In various embodiments, the location data can include a mode of transit where the item was lost or last seen. For example, a user may realize that the lost item was last seen before getting on a bus, or while in a taxi. The user can be prompted with the option to enter a mode of transportation where the item was left behind, such as "bus" or "taxi". Furthermore, the user can be prompted to enter a specific bus line, flight number, etc. In various embodiments, the user can also select the company or entity associated with the transportation service, such as Greyhound or Uber.

In various embodiments, location data such as geospatial data 244 that can include GPS data of a mobile device can be tracked automatically by, for example, logging geospatial data 244 continuously or at fixed or other intervals on a memory associated with the client device via an application stored on the client device and/or transmitting the geospatial data 244 continuously or at fixed intervals to the Lost and Found server 120. In various embodiments, location tracking preferences can be set by the user as user preferences associated with a user account. For example, a user concerned about battery consumption associated with location tracking can select an option to track the location at infrequent intervals. In various embodiments, location tracking is not automatic, but a user can preemptively log their current position, for example, if they believe the location is a high-risk location for losing items. In various embodiments, this data can be used to determine the proximity based subset, where tracking data of users finding an object is used in part to determine if their current location is close to another lost item.

Figure 4:
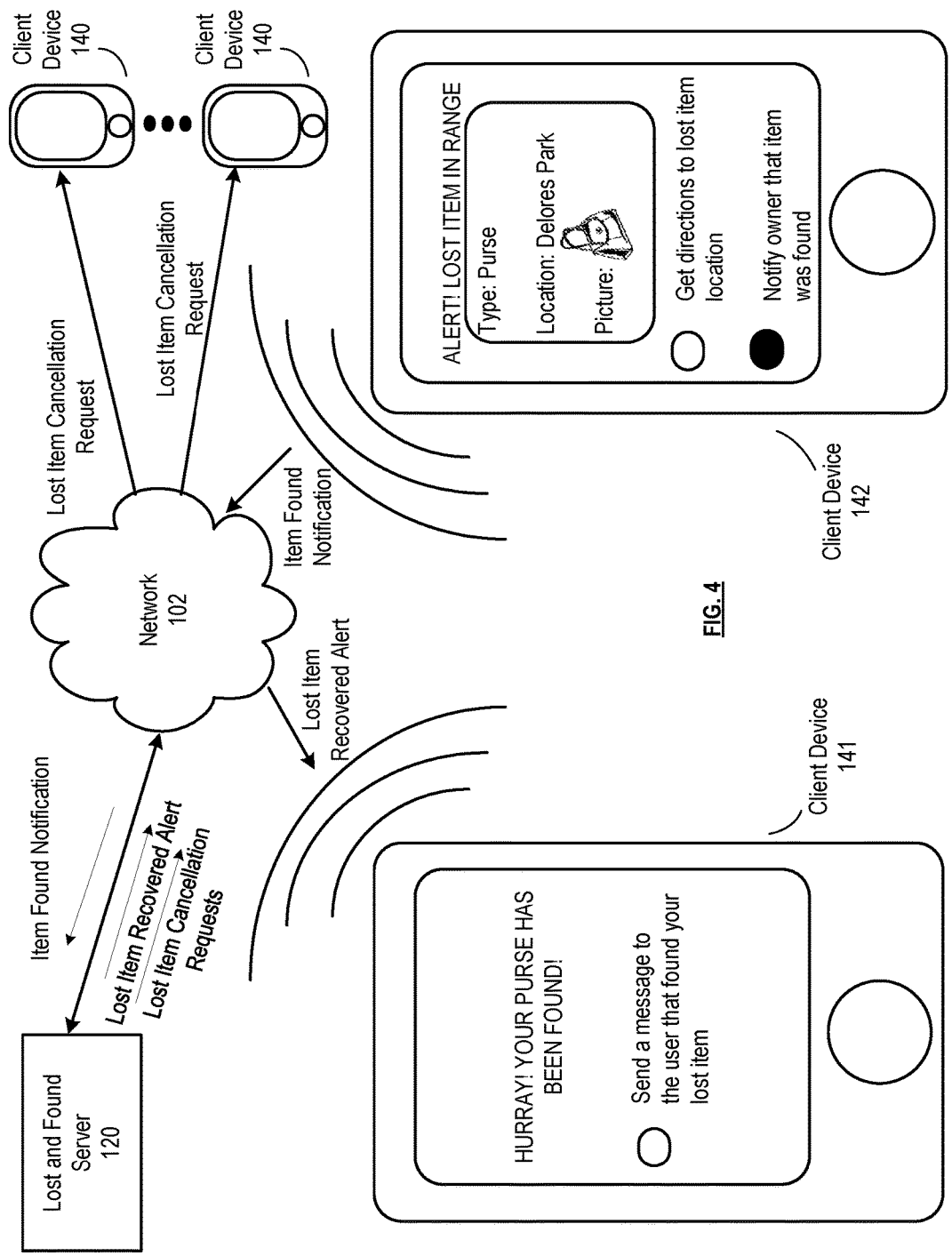
FIG. 4 is schematic block diagram of an embodiment of the present invention.

FIG. 4 is a schematic block diagram of an embodiment of the present invention, illustrating the reporting of finding a lost item in response to the lost item notification. In various embodiments, a user that finds a lost item in response to receiving the lost item alert can report that the item was found via an interface displayed on the corresponding client device 142, for example, by selecting an option on an interface associated with the alert itself, or selecting the lost item from a plurality of lost items to which the user has been notified. In various embodiments, a transmission of notification that the item was found can immediately be transmitted to the Lost and Found server 120, and an alert can be prepared in response for transmission back to the owner that reported the lost item, for example, prompting the client device 141 to generate an alert notifying the owner that the item was found. The alert can include a menu of options to retrieve the item and/or can include contact information such as a phone number and/or email address associated with the user that found the lost item. In various embodiments, the alert can include a link or prompt to enter a messaging service facilitated by the Lost and Found server 120 that allows the owner to contact the user that found the lost item, and allows communication between both parties to facilitate arranging retrieval of the lost item while allowing personal contact details such as phone numbers and email addresses between both parties to remain anonymous, wherein the Lost and Found server 120 generating message notifications to each party as communication is exchanged, prompting each client device to generate an alert for display to the owner that includes the message.

In various embodiments, once receiving an indication that the item is successfully found, the Lost and Found server 120 can generate a notification for transmission to the remaining client devices in the subset to cancel the alert, for example, to ensure that other users are not searching for an item that has already been found. This transmission can prompt the client device to generate an alert for display to the owner indicating that the item has been found and/or can prompt the client device to remove the lost item from a queue of lost items to which the user has been notified.

While not specifically shown, one or more users can indicate to the Lost and Found server 120 that they are actively searching for the item and the found item alert can be send to only those users that have indicated they are actively looking for the item. Other status information from seeking users can also be sent to the Lost and Found server 120 and be used to update the user that lost the item and optionally other seeking users. For example, the Lost and Found server 120 can notify the user that lost the item and other seeking users with real-time updates such as "four users are actively seeking the item", "the purse was not in the Women's restroom", "two of the seekers have abandoned the search", "one user is currently searching along the road and is asking the restaurant for assistance", "someone says they saw a dog like Spot running loose near the Ferry Building", etc.

Figure 5A:
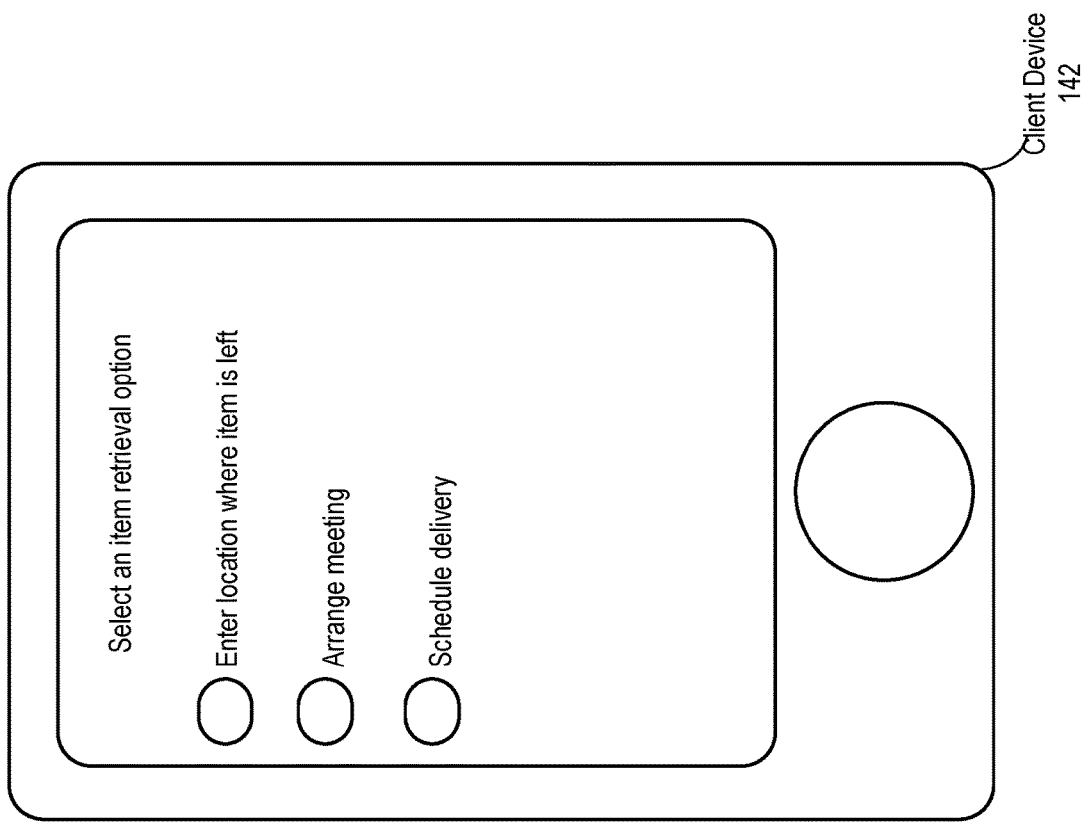
FIG. 5A is a graphical illustration of an example user interface displayed on a client device in conjunction with various embodiments of the present invention.

FIGS. 5A-5D illustrate the facilitation of lost item retrieval by the owner the lost item based on an item retrieval option selected by the user that found the lost item. In various embodiments, a user that found a lost item can be prompted to select an item retrieval option on a user interface displayed by the client device 142. FIG. 5A is a graphical representation of an example user interface displayed on client device 142 in response to the user indicating that they found the lost item. For example, a menu of options can include leaving the item at a specific location, arrange a meeting to return the item to the owner, and/or schedule a delivery to have the item delivered to the user, as well as other options for returning the item to the owner. A transmission with the item retrieval selection and relevant information associated with the selection, for example, provided by the user via user input to an interface or user account information, can be sent to the Lost and Found server 120, for example, in the same transmission with the notification that the item was found, or in a separate transmission thereafter. In response, the Lost and Found server 120 can generate and transmit retrieval instructions to the owner based on the item retrieval selection and relevant information received, for example, prompting the client device to generate an alert for display to the owner that includes the retrieval instructions. In various embodiments, this step can be instead performed by the owner and instructions can be sent to the user that found the item, and this role reversal can apply to the any of the applicable embodiments described hereafter.

Figure 5B:
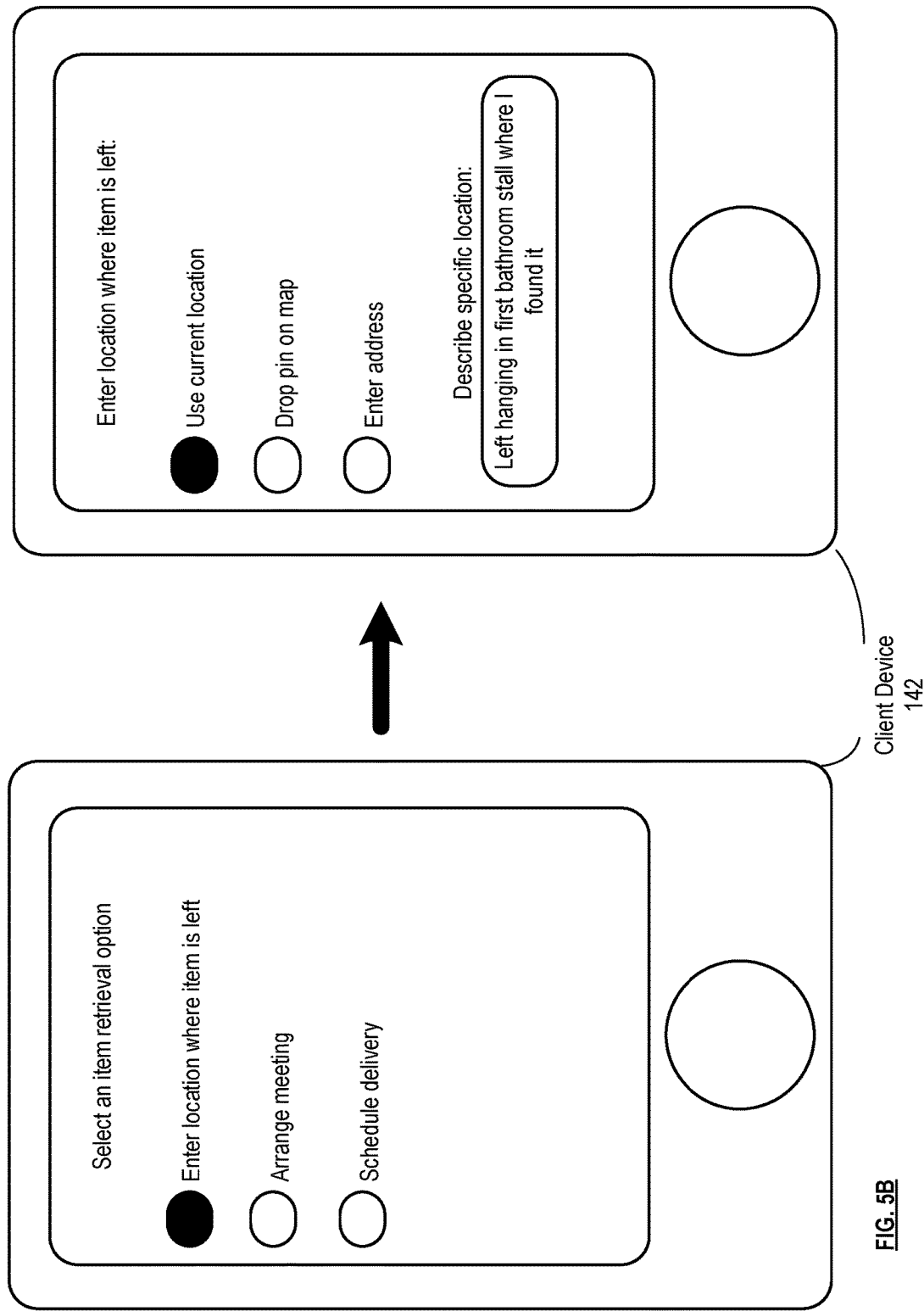
FIG. 5B is a graphical illustration of an example user interface displayed on a client device in conjunction with various embodiments of the present invention.

FIG. 5B is a graphical illustration of an example user interface displayed on client device 142 in conjunction with various embodiments of the present invention corresponding to the user that found a lost item selecting the option to leave the item at a specific location. This option may be selected, for example, in response to leaving the location where it was found or in a safer nearby location, such as hidden behind a bush or left with a hostess at a restaurant. A user selecting this option can be prompted by the client device to select the location where the item has been left behind and can choose their current location by utilizing geospatial data 244 associated with the client device, selecting a location on an interactive map, and/or entering descriptive details such as "left hanging in the first bathroom stall where I found it" or "left with hostess at front entrance." To aid in retrieval user can also be prompted to include a picture indicating where the item was left, especially if the item is left in a hidden location. For example, a camera associated with the client device such as camera 256 can be utilized by the user to take a photo when entering these descriptive details. The Lost and Found application on the mobile device can automatically prompt the user to take such a photo for transmission to the Lost and Found server 120. The retrieval instructions generated by the Lost and Found server 120 can include the location, descriptive details, and/or photograph. The instructions included in the alert displayed on the owner's client device can include these details, and can include a link or prompt to enter an interactive map mode. In various embodiments, the Lost and Found server 120 and/or Lost and Found app can facilitate navigation to the item by utilizing the location data associated with the owner's client device.

Figure 5C:
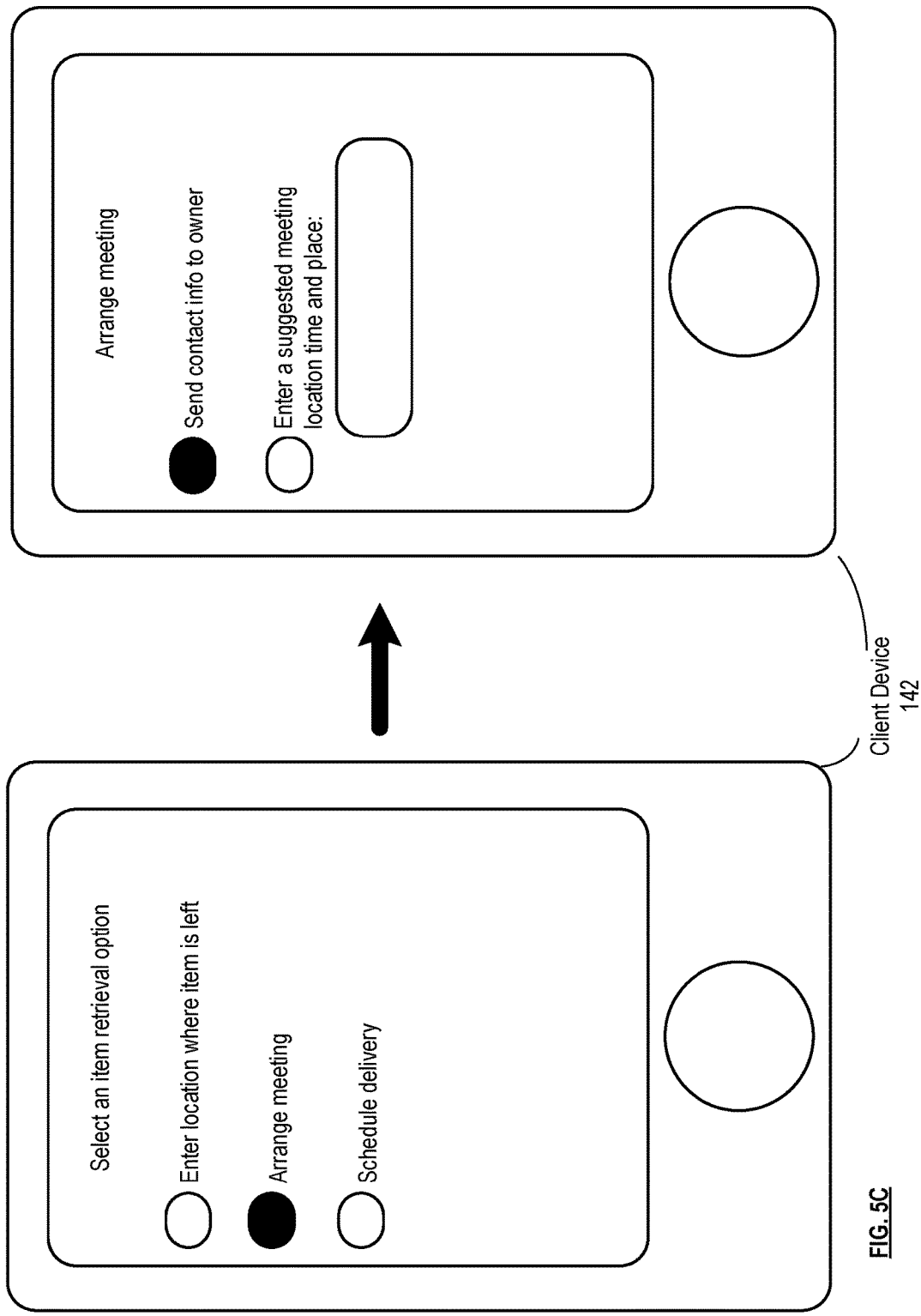
FIG. 5C is a graphical illustration of an example user interface displayed on a client device in conjunction with various embodiments of the present invention.

FIG. 5C is a graphical illustration of an example user interface displayed on client device 142 in conjunction with various embodiments of the present invention corresponding to the user that found a lost item selecting the option to arrange a meeting. The user can choose to enter contact information such as a phone number and/or email address to be sent to the owner, or can choose to automatically send contact information included in an account associated with the user, stored on the Lost and Found server 120. In various embodiments, the user can be prompted to enter a messaging service facilitated by the Lost and Found server 120 that allows the owner to contact the user that found the lost item, and allows communication between both parties to facilitate arranging retrieval of the lost item while allowing personal contact details such as phone numbers and email addresses between both parties to remain anonymous. Furthermore, the Lost and Found server 120 can generate message notifications to each party as communication is exchanged, prompting each client device to generate an alert for display to the owner that includes the message.

In various embodiments, the user can enter a suggested meeting location time and place. For example, if the user found the owner's purse at a coffee shop, and intends on remaining at the coffee shop for several hours, the user can indicate that the owner can retrieve the purse from them at the coffee shop until 3 pm. In various embodiments, the owner, upon receiving these suggested meeting details, will be prompted to accept or reject the meeting. Upon rejecting the meeting, the owner can select a counter-offer meeting arrangement, or can select a different delivery suggestion, for example, indicating that the other user should leave the purse with the cashier of the coffee shop because they will not be able to make it to the coffee shop until 4 pm.

In various embodiments, the user will be prompted to include a photo of themselves to aid the owner in finding them during the meetup. For example, camera 256 can be automatically utilized to prompting the user to take a photo. In other embodiments, the user can be directed to a photo library and/or social media application associated stored on the client device to select a photo of themselves. In various embodiments, a user account will already have a photo stored, and this photo can be sent to the user with other meetup information accordingly.

Figure 5D:
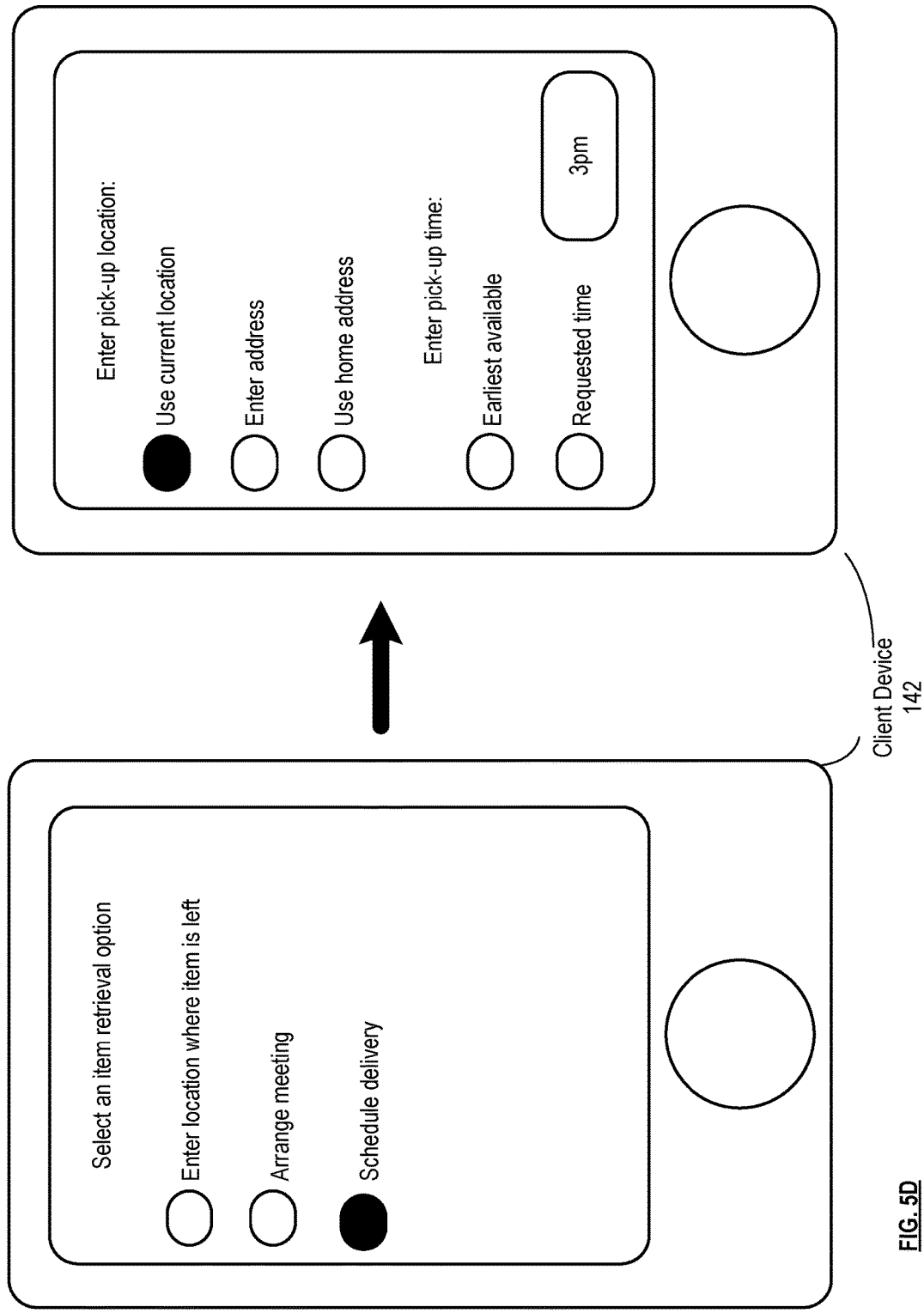
FIG. 5D is a graphical illustration of an example user interface displayed on a client device in conjunction with various embodiments of the present invention.

FIG. 5D is a graphical illustration of an example user interface displayed on client device 142 in conjunction with various embodiments of the present invention corresponding to the user that found a lost item selecting the option to schedule delivery of the item back to the owner. Delivery can be enabled, for example, by delivery employees associated with the system or by a third party shipping or delivery service associated with the system by contract or agreement. The user can be prompted to select a delivery type, such as a third party shipping service or a third-party door-to-door delivery service associated with the Lost and Found server 120, a rider service such as Uber or Lyft, or a delivery service will automatically be selected by the Lost and Found server 120. The user can enter a pick-up location and/or a pick-up time range. In various embodiments, the user can choose to use a stored address, for example, a home address indicated in the user account associated with the user. In various embodiments, the user can enter an address in a text field, select a location via an interactive map, or choose to use their current location based on geospatial data 244 such as GPS data associated with the client device.

Figure 5E:
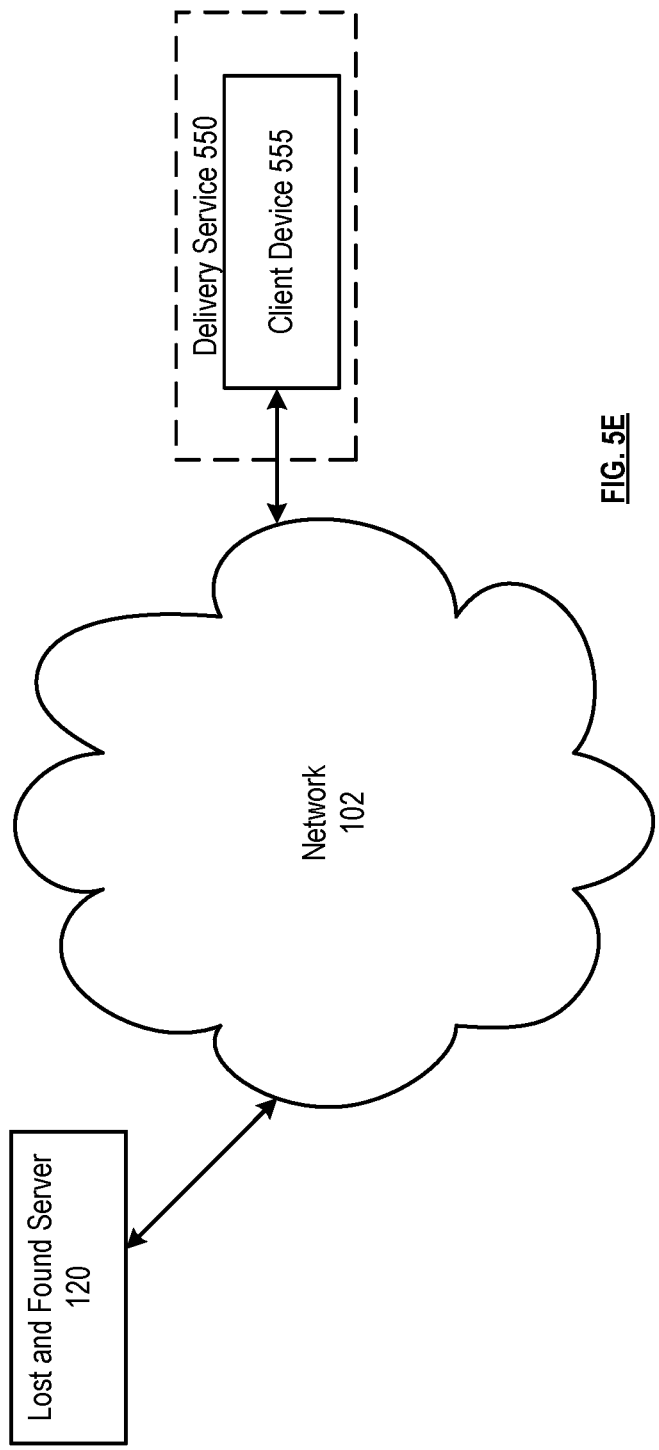
FIG. 5E is a schematic block diagram of an embodiment of the present invention.
Figure 5F:
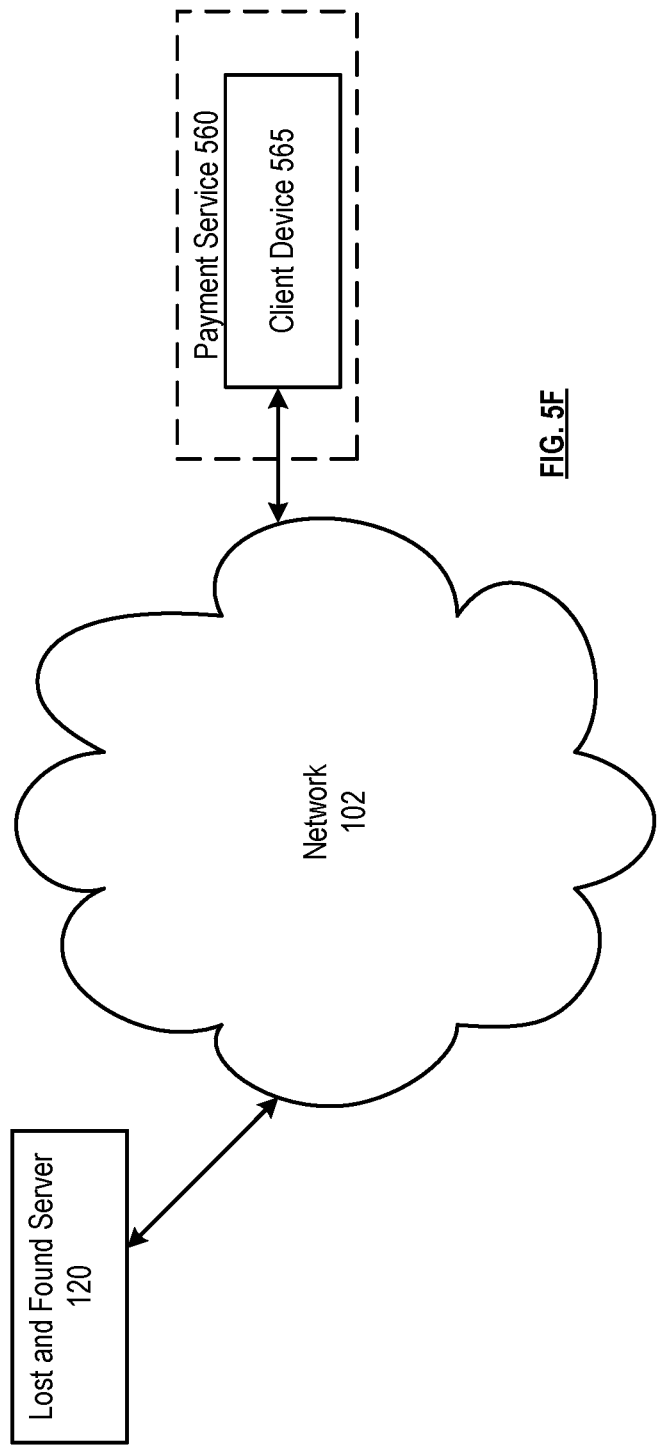
FIG. 5F is a schematic block diagram of an embodiment of the present invention.

FIG. 5E is a schematic block diagram of an embodiment of the present invention, illustrating the communication of delivery pick-up and drop-off information to a delivery service 550 associated with the Lost and Found system. In various embodiments, a delivery service client device 555 is coupled to network 102. The delivery service client device, such as a server, personal computer, and/or mobile device can be associated with a third party delivery service, or an employee of a third party delivery service, such as a shipping service, shared ride delivery service, or door-to-door delivery service such as FedEx, United Parcel Service (UPS), United States Postal Service (USPS), Uber, Lyft, Postmates, and/or TaskRabbit. In various embodiments, the delivery service client device can be coupled directly to the Lost and Found server 120. In various embodiments, the delivery service client device can be associated with an employee of the Lost and Found server 120 responsible for making deliveries. The delivery service client device can include a processing module, memory, and a network interface, and can be implemented by utilizing one of the plurality of client devices 140. In various embodiments, the Lost and Found server 120 can send a delivery notification to the user by prompting the client device 141 to generate an alert for display to the owner, prompting the user to select a drop-off location and/or time range. The owner can also select the drop-off location by choosing to use a stored address, for example, a home address indicated in the user account associated with the owner, by entering an address in a text field, selecting a location via an interactive map, or choose to use their current location based on geospatial data 244. In various embodiments, the lost item will automatically be dropped-off at a location associated with the user such as a home address indicated in the user account associated with the owner. In various embodiments, the owner will also be prompted to include delivery payment, or the Lost and Found service can facilitate its own delivery payment, for example, by utilizing payment information indicated in a user account associated with the owner or based on contractual agreements with the delivery service, with no additional charge to the owner. The Lost and Found service can facilitate delivery by transmitting the pick-up and drop-off information, as well as optional payment information, to the delivery service client device 555, and one or more employees of the delivery service can carry out the delivery. In various embodiments, the delivery service client device 555 will send confirmation of receipt of the delivery request and/or confirmation that the delivery was carried out back to the Lost and Found server 120. In various embodiments, the Lost and Found server 120 will transmit confirmation details received from the delivery service to client device 141 and/or client device 142 for display to the corresponding user. In various embodiments, rather than communicating delivery details with a delivery service, the Lost and Found server 120 can recommend a delivery method to the user that found the lost item, providing a third-party link to a delivery service and/or an address of the owner, and the user can be responsible for carrying out delivery themselves.

In various embodiments, a user reporting a lost item can include a reward value associated with the item. In such embodiments, the Lost and Found server 120 can facilitate payment of the reward amount from the owner to the user that found the item by prompting both parties for payment and/or banking information, or by utilizing information included in accounts associated with each user. In other embodiments, the Lost and Found server 120 can facilitate negotiation of a reward value, for example, by facilitating bidirectional communication between both parties via a messaging service as previously described. In various embodiments, a user can set conditions on the reward, for example, indicating that a reward will only be given if the item is delivered via a delivery service or meetup, and not left behind. In various embodiments, a first reward value can be indicated by the owner for payment to users that successfully find the lost item, and a second reward value can be indicated by the owner for payment to users that successfully deliver the lost item back to the owner. In various embodiments, instead of or in addition to paying a reward, an owner can thank the user that found or retrieved their lost item via a direct message. In various embodiments, other incentives can encourage users to find lost items. For example, a sponsor may provide promotions or free gifts for users that found and returned lost items. In various embodiments, owners can purchase discounted gift cards or other promotional materials to be gifted to the user that found their lost item.

FIG. 5E is a schematic block diagram of an embodiment of the present invention, illustrating the communication of payment details with a third party payment service. The Lost and Found server 120 can facilitate payment via a third party payment service 560, and can bidirectionally communicate with a client device 565 associated with the payment service. The payment service client device 565, such as a server, personal computer, and/or mobile device can be associated with a third party payment service such as PayPal, and/or an employee of a third party payment service. The payment service client device can include a processing module, memory, and a network interface, and can be implemented by utilizing one of the plurality of client devices 140.

In various embodiments, a user may find an item independently, and not based on a lost item alert. For example, a user may find a nice watch on the ground that was likely lost or left behind that they wish to return to its rightful owner. As the Lost and Found server 120 receives lost item notifications, they can be stored in a lost item database, for example, stored in the in memory of the Lost and Found server 120. The user can search the database via a search interface displayed on the client device, allowing the user to toggle search parameters such as physical location where the item was found, type of location where the item was found, time the item was found, type of item, item color, item brand, item size, etc. If the user indicates a match in the database, a transmission of notification that the item was found can immediately be transmitted to the Lost and Found server 120, and an alert can be prepared in response for transmission back to the owner that reported the lost item in a similar fashion described before. The user that found the item can also be prompted to select item retrieval preferences as described previously.

In various embodiments, instead of or in addition to searching the database of lost items, a user may wish to report the found item, for example, in response to failing to find the item in the database, and hoping that it will be report as lost by the owner a later time. Similar to the process of reporting a lost item, the client device can then prompt this user to provide a descriptive details and location details regarding the found item via a series of questions, menu options, and/or text fields of a user interface. The user can then provide location details by entering an address via a text field or selecting a point and/or region on an interactive map display. The user can also be prompted to provide descriptive details such as "found in back corner booth" or "found hanging in third stall of Women's restroom." An interface displayed on the client device can prompt the user to take a photo of the found item and/or a photo providing context as to where the item was found by utilizing a camera coupled to the client device such as camera 256. In various embodiments, the user can select an icon representing the item instead of taking a photo for privacy purposes, and can select an icon of a credit card instead of posting a photo of a found credit card. This may also be ideal for verification purposes, ensuring that a description of the item made by a claimed owner is not based on a photo of the item. The interface can also prompt the user to preemptively select item retrieval preferences to be applied at a later time when the found item is matched with its owner. In various embodiments, the user can select whether or not they wish to be alerted if an owner is matched with the lost item and/or if the owner successfully retrieves the item.

In various embodiments, to further facilitate successfully finding lost items, instead of or in addition to notifying nearby users of a lost item when a lost item notification is received, the Lost and Found server 120 can search a database of reported found items in response to receiving the lost item notification. Parameters of the search can include item type, descriptive information and/or key words provided by the user such as color, brand, and/or size, time the item was found, and/or the location where the item was found. The location parameter can include a geographical location range, address, or specific building or venue, as well as a location type such as "outside," "under a table," or "in a bathroom." The Lost and Found server 120 can also use a photo of the lost item to perform the search further based on photos associated with the found items, utilizing known image processing techniques such as object recognition, pattern recognition, color histogram matching, etc. In various embodiments, if a photo was not provided by the user, the Lost and Found database can perform an image web search based on brand name, descriptive key words, etc., provided by the user, and use one or more of the image results to perform the search against the found item photos. After performing the database search, the Lost and Found server 120 can identify one or more potential matches, and can transmit these matches back to the owner. The owner can evaluate these options and identify a true match, and a notification indicating the matched item can be transmitted back to the Lost and Found server 120. The Lost and Found server 120 can generate a transmission to client device associated with the user that reported the item as found, prompting the client device to generate an alert for display to the owner indicating that the found item has been claimed by its owner, and can prompt the user to select retrieval options or facilitate contact via a messaging service as described previously. In various embodiments, potential matches based on these parameters are continue to be identified as new found items are reported. If a new potential match is identified at a later time, the Lost and Found server 120 can generate a transmission to client device associated with the owner to alert the user of new potential matches in real time.

In various embodiments, the owner of a lost item can manually search the database of found items, for example instead of or in addition to reporting the lost item, and a search interface displayed on the client device can allow the user to toggle search parameters such as physical location range where the item was lost and/or last seen, type of location where the item was left, time range the item was lost and/or last seen, type of item, item color, item brand, item size, etc. The ability to toggle the location parameter may be especially ideal for users that don't know exactly where the item was left that may wish to "check" a variety of locations. If a match is identified, a notification indicating the matched item can be transmitted back to the Lost and Found server 120. The Lost and Found server 120 can generate a transmission to client device associated with the user that reported the item as found, prompting the client device to generate an alert for display to the owner indicating that the found item has been claimed by its owner, and can prompt the user to select retrieval options or facilitate contact via a messaging service as described previously. In various embodiments, if item retrieval preferences were already selected by the user that found the item when the item was reported as found, the Lost and Found server 120 will automatically transmit the appropriate retrieval instructions to the owner in response receiving the match notification from the client device of the owner.

Figure 6A:
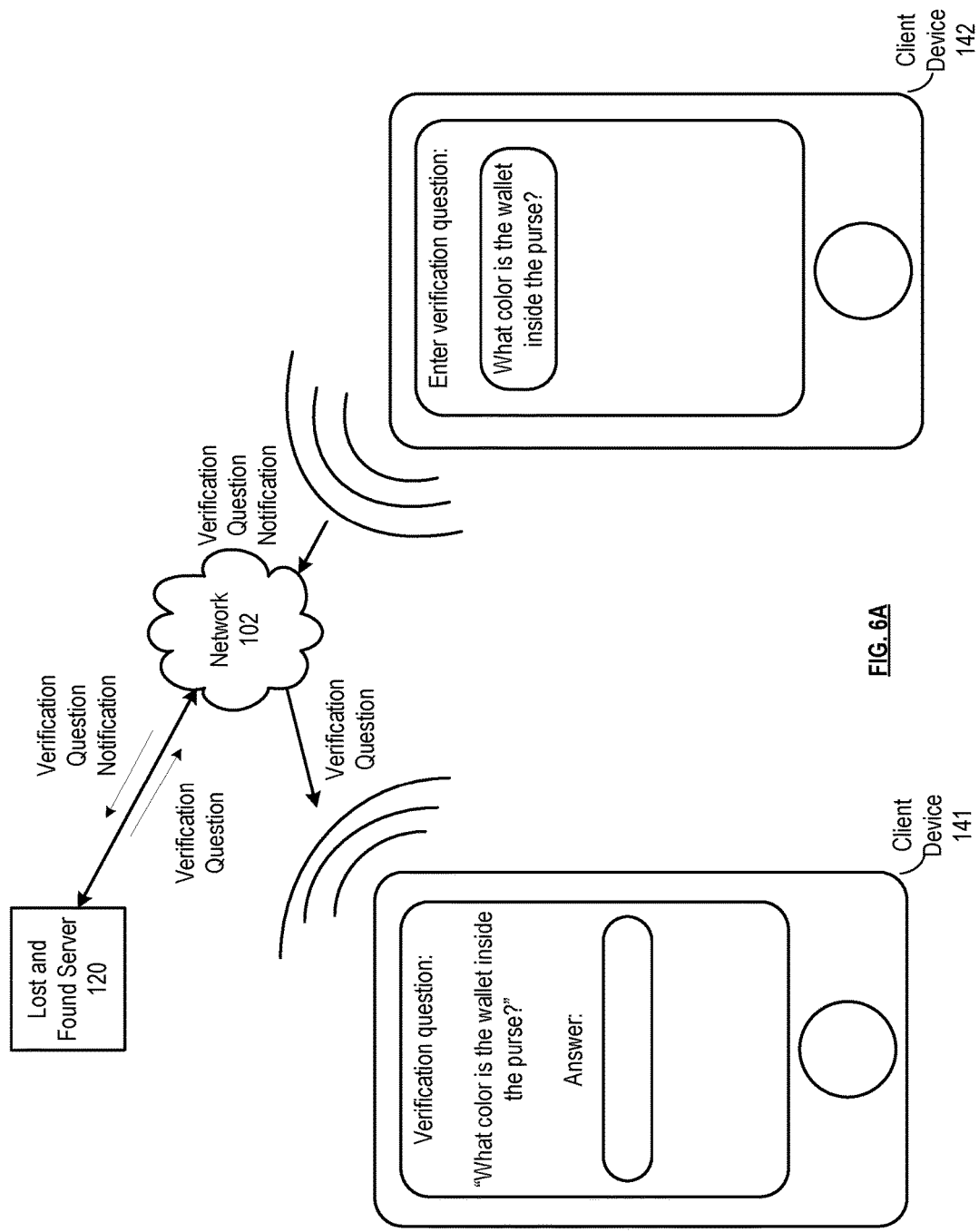
FIG. 6A is a schematic block diagram of an embodiment of the present invention.
Figure 6B:
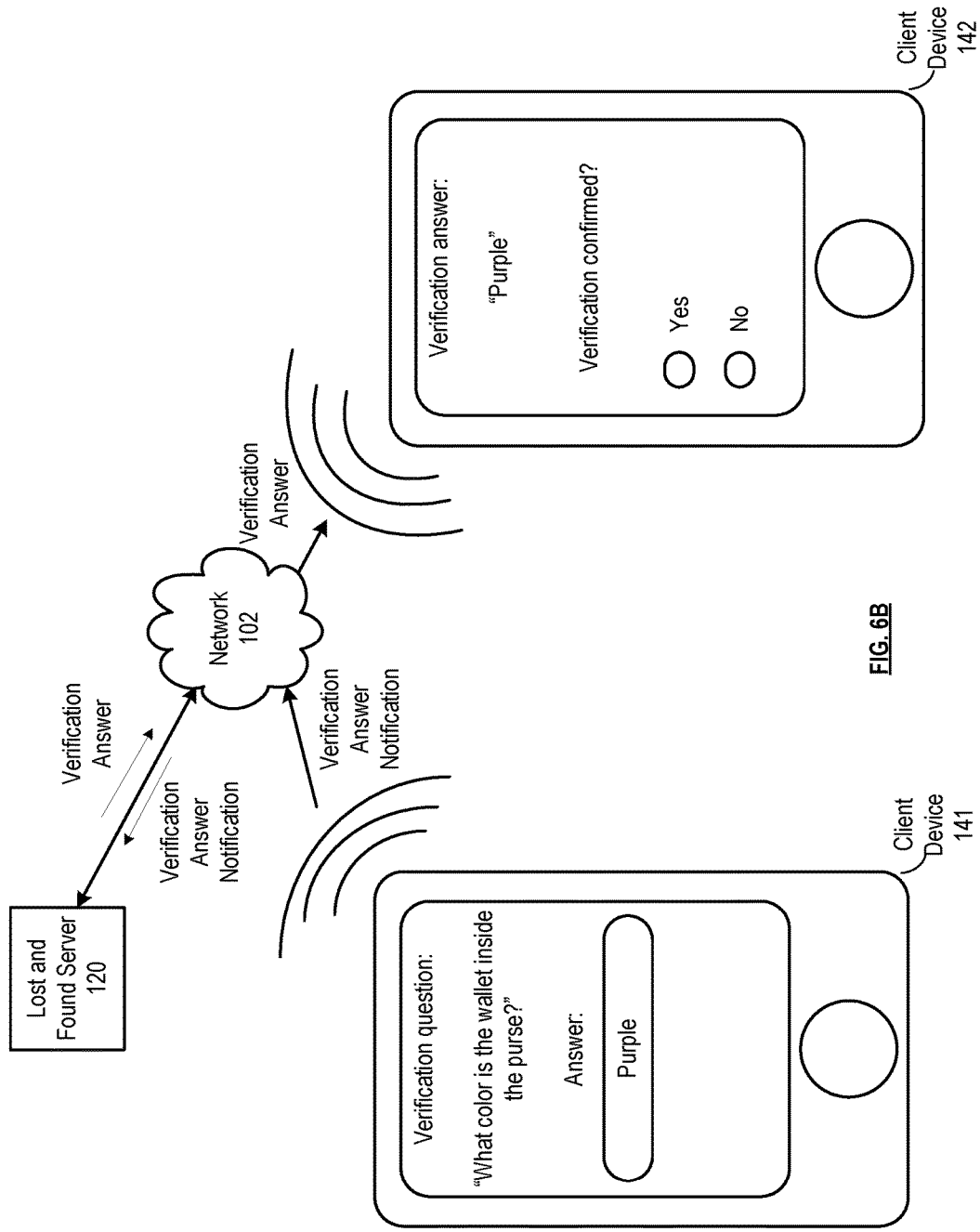
FIG. 6B is a schematic block diagram of an embodiment of the present invention.

FIGS. 6A and 6B are schematic block diagrams of an embodiment of the present invention, illustrating a verification step that can be included before item retrieval is facilitated. For example, any user can search the database of found items and claim to be the owner of any of the lost item. For example, nothing is to prevent a user from searching for expensive jewelry, see a picture of a nice watch they would like to own, and claim to be the owner that lost the watch. Likewise, a user claiming to have found an object may have accidently retrieved the wrong item, or purposefully be deceitful in hopes of being paid the reward when the item was not truly found. Therefore, the verification step can include a first step where the user that found the object verifies that claimed owner is the true owner, and/or a second step where the owner of the object verifies that the user that claimed to have found the object truly found the correct object. The steps can be done in any order or contemporaneously. In various embodiments, the owner and/or user that found the item can select an option to forego their respective verification step if they deem verification to be unnecessary.

To facilitate the first verification step, the user that found the lost item can be prompted to select or enter custom verification questions via an interface displayed on client device 142, for example: "what color is the wallet inside the purse?", or "what is inscribed on the back of the watch?" that, when answered would be sufficient proof that the claimed owner is the true owner. The Lost and Found server 120 can receive these questions from the user and can send a notification prompting the client device 141 to generate an alert for display to the owner that includes a prompt for the user to answer the question. The answer can be transmitted back to the client device 142 for review by the user that found the item, and upon successful verification, the user can be prompted to select item retrieval options as discussed previously. In various embodiments, the user that found the lost item can enter the answers to the verification questions, and the Lost and Found server 120 can generate its own verification results by comparing the answer received from the owner to the answer received from the user that found the lost item, and evaluation of the answer by the user that found the lost item is not necessary for verification. In various embodiments, the Lost and Found server 120 will not require the user that found the item to select or generate questions, and can instead prompt the owner to describe the item and/or send one or more preset questions in response to receiving the notification of claimed ownership of the item from the client device of the claimed owner.

To facilitate the second verification step, the owner can also be prompted to select or enter custom verification questions via an interface displayed on client device 141. In this case, it is also feasible for the owner to ask for more photographic evidence, as the user that found the item likely has the lost item in hand. The owner can specifically request certain photos, for example: "please take a picture of the inscription on the back of the watch" or "take a picture of the inside of the purse." The Lost and Found server 120 can receive these questions and/or requests for photos from the owner and can send a notification prompting the client device 142 of the user that claims to have found the lost item to generate an alert for display to the user that includes a prompt for the user to answer the question, or facilitate use of a camera coupled to the client device such as camera 256 to take one or more photos. The answers and/or photos can be transmitted back to client device 141 for review by the owner, and a notification of successful verification can be sent back to the Lost and Found server 120. In response, the Lost and Found server 120 can send a transmission prompting the user that found the item to select item retrieval options as described previously. In various embodiments, the owner can enter the answers to the verification questions, and the Lost and Found server 120 can generate its own verification results by comparing the answer received from the owner to the answer received from the user that found the lost item, and evaluation of the answer by the owner is not necessary for verification. In various embodiments, the Lost and Found server 120 will not require the owner to select or generate questions, and can instead prompt the user that found the item to describe the item, send one or more preset questions, and/or prompt the user to take a photo of the item in response to receiving the notification claiming that the item was found from the claimed finder of the item.

In various embodiments, a user can indicate that the other party failed their respective verification step, and a notification can be sent from their respective client device to the Lost and Found server 120 flag that user as fraudulent. The Lost and Found server 120 can send a notification to the fraudulent user, for example, issuing a warning for display by the client device of the fraudulent user. The Lost and Found server 120 can also log this fraudulent activity in an account associated with the fraudulent user, and can use this information in handling further reports claiming that the user found the item or claiming ownership of a found item, for example, requiring more stringent verification steps, or banning the user for a period of time.

In various embodiments, users can set alert preferences in conjunction with an account associated with the user, and will only be included in a proximity-based proper subset generated by the Lost and Found server 120 for a lost item if parameters associated with the lost item compare favorably to the alert preferences. These parameters can include reward value range, type of lost item, value of lost item, proximity to the location of the lost item, time of day, weather conditions, type of location, a region the location falls in, etc. For example, a user can specify, for example via a settings user interface displayed on the client device, that they only wish to be alerted if an item is within 0.5 miles of their current location and has a reward value of at least $100. In various embodiments, a user can also indicate that they wish to be alerted even if their current location does not fall within the location parameters used to generate the proximity-based proper subset. For example, a proximity-based proper subset of users for a lost dog in Delores park on a 75 degree sunny day with a $1000 reward can be generated by the Lost and Found server 120 may be generated based on users that are within 0.5 miles of a location region associated with the dog, but an ambitious user that is 1.5 miles will also be included in this subset if, for example, they indicated in their user settings that they wish to be alerted if a lost item is a lost pet or child and is within 10 miles of their current location and/or if they indicated they wish to be alerted if a lost item has a reward value of at least $500 and is within 2 miles of their current location. This particular user may have also indicated that they wish to be alerted of any lost items in Delores Park because they enjoy an excuse to be outside, and/or may have indicated that they only wish to be alerted of lost items in outdoor locations if the temperature is at least 70 degrees, or if there is no rain. In various embodiments, users can set several tiers of alert preferences for the same parameter types. For example, a user can indicate that they wish to be alerted if a lost item has a reward value of at least $500 if it is within 2 miles of their current location, but also be alerted if they are within 10 miles of a lost item with a reward value of at least $2000, and not be alerted at all for any item with a reward value of less than $10.

In various embodiments, users can also set preferences with respect to the alerts themselves. For example, the user can select if they wish to be alerted via sound emitted by the client device, vibration emitted by the client device, text message sent to the client device and/or push notification displayed by the client device. In various embodiments, the user can assign different alert preferences based on factors such as a reward value range, the type of lost item, value of lost item, proximity to the location of the lost item. For example, the user may wish to be alerted with a sound only if the lost item has a reward value greater than $100.

In various embodiments, alert settings can include location tracking settings, allowing users concerned with battery consumption, or user that do not wish to be disturbed at certain times, to turn off tracking of their device so that they will not receive notifications, as the Lost and Found server 120 will not include them in the proximity-based proper subset. Furthermore, the user can select options to update location and more frequent or less frequent intervals. In various embodiments, the user can turn off location tracking, but select their current location manually via a text or map interface, and the Lost and Found server 120 will use this location when determining if the user should be included in the proximity-based proper subset.

In various embodiments, a user may have received multiple alerts. An interface displayed on the client device can allow users to look at all alerts received recently, and can show users which items have already been found. In such embodiments, a set of received alerts can be stored on a memory of the client device, or fetched via a request to the Lost and Found server 120. In various embodiments, a user can dismiss an alert when it is received, or later when viewing all the alerts, to indicate that they are no longer interested in finding this item, and the item will no longer appear in the list. In various embodiments, the client device can also send a notification to the Lost and Found server 120 automatically in response to dismissal of an alert, and the item will be removed from a list of lost items assigned to the user, for example in a mapping indicating lost items assigned to users in the system, stored in memory of the Lost and Found server 120. In various embodiments, the user can select preferences with regards to the amount of time these alerts remain available, for example, selecting an option for alerts to be dismissed automatically after 48 hours. In various embodiments, the user can set different time frames based on various parameters of the lost item. In various embodiments, alerts will be dismissed automatically after a fixed amount of time determined by the Lost and Found server 120. In various embodiments, this dismissal time frame is stored in a memory of the client device. In other embodiments, if different dismissal times are assigned to different items, the Lost and Found server 120 can send the dismissal timeframe in the alert notification, or can send a dismissal notification to the client device after the dismissal timeframe has elapsed, and the client device can remove the alert from the set stored in memory of the client device. In various embodiments, reported lost items will also be removed from the lost item database by the Lost and Found server 120 if a fixed amount of time has elapsed, which can be the same duration as the dismissal timeframe, or a longer time frame. Similarly, in various embodiments, reported found items can be removed from the found item database by the Lost and Found server 120 if another fixed amount of time has elapsed. In various embodiments, lost items and or found items are assigned a duration of time they will remain in the database. This can be the same for all items reported, or can be based on parameters of the reported item. In various embodiments, lost items and/or found items will be removed from their respective database if a database memory constraint is exceeded. In various embodiments, the Lost and Found server 120 will send a notification to the client device for display to the user that reported the lost item or found item indicating that it has been removed from the database.

In various embodiments, accounts associated with users can include one or more "items of value" and/or "items likely to be lost." Users can include descriptive details of such items and can include a photo, for example, on a settings user interface displayed on the client device. The interface may prompt the user to take a photo of the item, and can use a camera coupled to the client device such as camera 256. The interface may also prompt the user to provide a photo that was previously taken, and the user can be directed to a photo library and/or social media application stored on the client device to select a photo of the item. This allows users to have descriptive information and photos of the item ready if the item is ever lost that may otherwise be unavailable, or take up precious time to enter, when the item is actually lost. When a user is reporting a lost item, they can be prompted to choose if they wish to select from one of these preemptively logged items or generate a report for a new item. In various embodiments, items can be added to an account associated with the user automatically when a new lost item report is generated.

In various embodiments, a user can set their own high-risk location preferences by entering multiple locations they personally believe are high risk, for example, listing a restaurant where the user frequently sets down their personal belongings. In various embodiments, the user can select a location type, and all addresses corresponding to this location type can be flagged as high-risk locations. For example, a user may know that they tend to put their purse down while dining at restaurants and while trying on clothes in changing rooms of retail establishments, and may select "restaurants" and "clothing stores" as high-risk locations. In various embodiments, a log of locations associated with previous lost items associated with the user can be used to determine high-risk locations. In various embodiments, the preferences and/or locations associated with all of the users in the system, or a subset of other users with user profiles that are similar to the user, can be used to automatically flag or suggest to the user the set of high-risk locations. In various embodiments, system-wide high-risk locations that apply to all users of the system or a selected subset of users of the system can be set based on analysis of this data. In various embodiments, system-wide high-risk locations can be set manually by an administrator of the system based on recommendations made by the system or known high-risk locations or known high-risk location types. For example, locations that correspond to airport security checkpoints, malls or amusement parks may be selected as high-risk locations because people tend to lose things at these types of establishments. In various embodiments where the user's location is tracked, the user can be notified automatically when they enter a high-risk location and to use caution. In various embodiments, the frequency and/or precision of location tracking can be increased in response to a user reporting and/or the system automatically recognizing that a high-risk location has been entered by the user.

In various embodiments, location data of a lost item can be treated uniformly, and the Lost and Found server 120 will select the proximity based subset of users to alert by treating the area of a region, the points along a route, a set of distinct locations, etc., with the same weight. In various embodiments, it may be ideal to employ a non-uniform approach, for example, if there is a higher probability that the item was lost in certain portions of a region, route, or set of distinct locations. For example, a portion of the location data that corresponds to a high-risk location can be assigned a higher loss probability than other portions of the location data. In various embodiments, the user will be prompted to select portions of a region, route, or set of distinct locations that they believe are most likely places where the item was lost. For example, if the location data includes a route from a bus stop to the user's home, the user might determine that lost keys were most likely left at the Starbucks the user stopped at on the way, but that it is also possible that the keys fell out of their pocket anywhere along the route. The user can indicate via an interface displayed on the client device which portions of the route should be assigned a higher weight. In various embodiments, selecting the proximity based subset of users to alert of the lost item will be based in part on various probabilities or weights assigned to the locations. For example, users that are located within 0.5 miles of the Starbucks may be alerted, and only users within 50 meters of the rest walking route will be alerted. In various embodiments, this weight information will be included in the lost item alert received by each user, for example, by indicating via text, map, or graphical representation "Keys most likely left in Starbucks, may also be on the ground along walking route", for example, assisting notified users of where to search first. In various embodiments, the Lost and Found server 120 automatically treats the location data non-uniformly based on a deterministic function, defined probability distribution, statistical analysis of one or more user's location history or lost item history, etc. For example, the Lost and Found server 120 can automatically assign higher weight to high-risk locations identified in the location data.

In various embodiments, the Lost and Found server 120 can treat lost item notifications received from users non-uniformly. For example, the Lost and Found server 120 may choose to give some lost items higher priority than others, and can use this assigned priority when generating the proximity based subset. For example, the Lost and Found server 120 can alert users within 2 miles of a location region corresponding to a high priority item, and alert users within only 0.25 miles of a location region corresponding to a low priority item. In various embodiments, the Lost and Found server 120 can surpass alert preferences, alerting all users within proximity of a high priority item regardless of alert preferences. In various embodiments, the Lost and Found server 120 can assign priority based on the reward offered, for example assigning higher priority to lost items that correspond to higher rewards. In various embodiments, the Lost and Found server 120 can assign priority based on the type of item lost, or the value of item lost, for example assigning higher priority to expensive jewelry, lost children, and lost pets and lower priority to lost jackets and keys. In various embodiments, the Lost and Found server 120 can assign priority based on the user, the user account, and/or user history. For example, a user that found several lost items may be granted higher priority as a reward for their loyalty. In various embodiments, users can pay a subscription fee to subscribe to automatic higher priority levels, or a one-time fee to grant the lost item higher priority. In various embodiments, the Lost and Found server 120 can generate a likelihood value corresponding to the likelihood that the item is recoverable, and can further base the priority based on the likelihood value, for example assigning higher priority to lost items with higher likelihood values. For example, the Lost and Found server 120 can calculate the likelihood based on the amount of time that has elapsed since the item was lost, how likely the item is to be stolen, the size of the item, and/or the type of location where the item was lost. The Lost and Found server 120 can also calculate the likelihood value based on the size of the location region provided by the user. For example, a lost item may be assigned a higher likelihood value if the user provided an exact location than a lost item where the user provided a larger and/or more ambiguous location region, route or set of locations.

In various embodiments, a user can be prevented from entering a location region, route, or set of locations that is too large. For example, it may be considered unreasonable to allow a user to indicate that the item may have been left anywhere in the city of San Francisco, or anywhere along Route 1 between San Francisco and Los Angeles. In various embodiments, restrictions on location size can be fixed for all lost items, or can be calculated separately for each reported lost item based on reward value, value of the item, one or more types of locations in the region, and/or user history or subscriptions as described previously.

FIG. 7 is a schematic block diagram of an embodiment of the present invention, illustrating the utilization of a plurality of registered entities. Registration information, account information, and location information can be stored by the memory 124 of the Lost and Found server 120 accordingly. The Lost and Found system can also communicate with one or more client devices 705 associated with each entity, which can be implemented utilizing at least one server, at least one personal computer, at least one mobile device, and/or one or more of the plurality of client devices 140, via the network 102. In various embodiments, the registered entities can include one or more drop-off hubs 710, one or more registered establishments 720, and/or one or more transportation entities 730.

In various embodiments, one or more drop-off hubs 710 can serve as suggested drop-off locations for users that don't wish to leave an item in an unsafe location where they found it. In various embodiments, the hub can coordinate item retrieval with the owner, and the user that found the item does not need to be bothered with meeting the owner or delivering the item to the owner, and in various embodiments, can still receive reward payment for successful drop-off to the hub. This may also be ideal in situations where a user finds an item that does not have a corresponding lost item report and thus has not yet been matched to an owner, and where the user does not want to leave the item behind or hold on to it for an indefinite period of time. A user can send a request to the Lost and Found server 120 via user input to the client device transmitted to the Lost and Found server 120 for a list of nearby hubs based on the current location indicated by geospatial data 244 of the client device. In various embodiments, the Lost and Server can send navigational instructions to the client device based on a selected hub received by the Lost and Found server 120. The user can notify the Lost and Found server 120 that an item is being dropped off at a particular hub, and/or a client device 705 of the hub can send a notification to the Lost and Found server 120 indicating that an item corresponding to a reported lost item or reported found item has been delivered. In various embodiments, drop-off at a hub is a separate option for item retrieval as discussed in conjunction with FIG. 5A, or drop-off at a hub can be specified as an option when specifying where an item was left in conjunction with FIG. 5B. In various embodiments, the user can enter the hub corresponding to their current location based on geospatial data 244, enter an address of the hub, and/or enter a hub identifying name or ID number. In various embodiments, in response to receiving an indication that an item has been dropped-off by the client device of the user that found the lost item and/or client device 705, the Lost and Found server 120 can send an alert to the first client device for display by the owner indicating that the lost item is ready for pick up at the hub. This alert can include the location of the hub, and/or provide navigation instructions to the hub based on the geospatial data 244 of the client device of the owner. The Lost and Found server 120 can communicate notifications with the client device 705 associated with the hub indicating that an owner of one of the lost items stored at the hub has been identified and/or request the hub to select item retrieval preferences or instructions as described previously. In various embodiments, the Lost and Found server 120 can send notifications to the client device of the hub indicating one or items that have been removed from the database, and that these items should be donated. In various embodiments, the hubs can host garage sales, auctions, or giveaways in conjunction with these items. In various embodiments, the hubs can communicate details of such events with the Lost and Found server 120, and the Lost and Found server 120 can generate an alert indicating these details to all of the users of the system, or a subset of users selected based on proximity to the event based on geospatial data 244, a home address, etc., or based on user settings, for example indicating hubs of interest, event types of interest, whether or not hub alerts are turned on or off, etc. The alert can be transmitted when the event details are received from the hub, at a predetermined time before the event, at predetermined times indicated in user settings, and/or at the time of the event. As further incentive for an entity or establishment to serve as a hub, proceeds from such events can go towards the entity or establishment, or to a charity selected by the entity or establishment. Other incentives can include advertisements associated with the hub entity or establishment being transmitted by the Lost and Found server 120 for display on the client devices 140 of users of the system.

In various embodiments, entities that often receive reports and/or deliveries of lost items can also register with the system as a hub. For example, police departments, dog pounds, insurance companies, etc. can register as hubs and can communicate with the Lost and Found server 120 via their own client device 705, and/or via a plurality of client devices 140 associated with employees of such entities. In such embodiments, these hubs can furthermore elect to receive relevant lost item notifications generated by nearby users automatically. In such a fashion, police reports or insurance claims can be generated automatically in response to receiving lost item reports by the Lost and Found server 120, a dog pound can receive lost pet notification and check to see if they recently found any animals matching the description provided in the lost item report, etc. Furthermore, found item notifications can be sent to such establishments, for example, allowing the police to check their police reports to see if such an item was report, allowing the dog pound to provide instructions for drop-off, etc. In various embodiments, these entities can generate custom responses, instructions, or elect to open direct communication with the user that lost or found an item via the direct messaging described previously. In various embodiments, relevant entities that will receive the notifications will be set automatically by the system and/or can be set in user settings, for example, allowing a user to enter insurance information and select their personal insurance company, elect that only items valued over $500 are sent to the police, etc. In various embodiments, the Lost and Found server 120 can generate assistive notifications to users in response to receiving lost or found item reports, for example, giving the user of a lost pet the phone number of a local pound, advising the user of a lost laptop to remotely lock and/or wipe the device, sending URL links to relevant blogs associated with third party sites and/or links to internal blogs generated by other users of the system based on their experience.

In various embodiments, one or more establishments 720, such as large establishment including malls and/or amusement parks, can provide detailed location information and/or custom maps. The Lost and Found server 120 can perform additional actions or provide specific instructions based on preferences set by the establishment. In various embodiments, users reporting lost or found items at such establishments can interact with a custom interface unique to the establishment. For example, a user can interact with a map of Disney World or a list of attractions, indicating that an item was lost on either It's a Small World or Space Mountain, or indicating that an item was lost somewhere in Frontierland. In various embodiments, employees of the establishment, such as mall cops or amusement park employees, can be receive lost item notifications via their own client devices 140, and in some embodiments, can receive custom lost item notifications, or be included in proximity-based proper subsets based on a different set of parameters. In various embodiments, users that find items can be directed to a lost and found center associated with the establishment, and the lost and found center can act similarly to the hubs described previously. In various embodiments, such preferences specific to use of the system at the establishment can be set via a client device 705 associated with the establishment itself, connected to the network 102.

In similar embodiments, transportation entities such as bus companies, taxi companies, shared ride companies, airlines, etc., can register with the system, and the Lost and Found server 120 can perform additional actions or provide specific instructions based on preferences set by the transportation entity in response to users reporting lost or found items in a vehicle of the transportation entity. In various embodiments, can interact with a custom interface unique to the transportation entity, for example, selecting a flight number from a menu of flight numbers or searching a Taxi cab number from a menu of taxi cabs. In various embodiments, employees of the transportation entity, such taxi drivers or airline personnel, can be receive lost item notifications via their own client devices 140, and in some embodiments, can receive custom lost item notifications, or be included in proximity-based proper subsets based on a different set of parameters. In various embodiments, users that find items can be directed to a lost and found center associated with the transportation entity, and the lost and found center can act similarly to the hubs described previously. In various embodiments, a vehicle and/or employee of the transportation entity can be tasked and given instructions via the Lost and Found server 120 to facilitate delivery of the lost item to its owner. In various embodiments, such preferences specific to use of the system in conjunction with the transportation entity can be set via a client device 705 associated with the establishment itself, such as one of the plurality of client devices 140, connected to the network 102.

In various embodiments, instead of reporting an item that has been found and needs to be returned to its rightful owner, users can also report items they wish to sell, or wish to be "found", along with a price, and other users can search the database in a similar fashion as described previously, not to recover a lost item, but to buy a new item. The Lost and Found server 120 would facilitate the exchange as described previously, and the seller of the item can select item retrieval preferences as described previously. The Lost and Found server 120 can also facilitate purchase payment in a similar fashion to facilitating reward payment as described previously.

In various embodiments, instead of reporting a lost item, users can post questions or seek advice on matters to which they seek to "find" clarity. Other users can respond to these queries, for example, as a post to the report, or directly via a messaging service as described previously. In various embodiments, the user seeking advice can indicate a reward as described previously to be granted to a user that provides a helpful answer.

In various embodiments a lost and found server includes a network interface for communicating via a network, a memory that stores a lost and found server application, and a processing system, coupled to the memory and the network interface. The processing system includes at least one processor that executes the lost and found server application that bidirectionally communicates item retrieval data with a plurality of users of a plurality of client devices via the network interface in conjunction with recovery of a first lost item by first user in the plurality of users. The item retrieval data includes lost item menu data generated by the processing system and sent to a first client device of the plurality of client devices corresponding to the first user for display to the first user via a first interactive interface displayed by a corresponding first display device of the first client device, and the first interactive interface prompts the first user to enter lost item description data and lost item location data via first user input to the first interactive interface. The item retrieval data further includes lost item selection data received from the first client device that includes the lost item description data and the lost item location data generated by the first client device in response to the first user input. The item retrieval data further includes lost item alert data automatically generated by the processing system in response to receiving the lost item selection data and sent to a proximity-based proper subset of the plurality of client devices. The lost item alert data includes the lost item description data and the lost item location data, and the proximity-based proper subset is selected by the processing system automatically in response to receiving the lost item selection data based on comparing the lost item location data to client device geospatial data generated by and received from the plurality of client devices. The proximity-based proper subset of the plurality of client devices automatically display a lost item alert on corresponding display devices of the proximity-based proper subset of the plurality of client devices. The item retrieval data further includes found item notification data received from a second client device included in the proximity-based proper subset associated with a second user in the plurality of users that found the first lost item. The found item notification data is generated by the second client device based on second user input to a second interactive interface displayed by a second display device of the second client device in response to the lost item alert data, and the second user input indicates that the first lost item was found. The item retrieval data further includes found item alert data automatically generated by the processing system in response to receiving the found item notification data and sent to the first client device. The first client device automatically displays a found item alert on the first display device indicating that the first lost item was found in response to receiving the found item alert data.

In various embodiments, the found item notification data received from the second client device includes a retrieval location generated by the second client device in response to the second user input. The found item alert data sent to the first client device includes retrieval instruction data generated by the processing system for display via the first display device, and the retrieval instruction data includes the retrieval location generated by the second client device in response to the second user input. In various embodiments, the second interactive interface prompts the second user to select the retrieval location via an interactive map displayed on the second display device. In various embodiments, the found item notification data includes geospatial data generated by the second client device in response to the second user input indicating an option to set the retrieval location to their current location via the second interactive interface. In various embodiments, the item retrieval data further includes navigation data automatically generated by the processing system in response to receiving the found item notification data, and sent to the first client device for display by the first display device. The navigation data is generated based on geospatial data received from the first client device and the retrieval location.

In various embodiments, the item retrieval data further includes a found item drop-off notification received from a third client device associated with one of a plurality of registered drop-off entities indicating that the first lost item was dropped-off at the one of the plurality of registered drop-off entities. The item retrieval data also further includes a ready for pick-up alert generated by the processing system in response to receiving the found item drop-off notification, and sent to the first client device for display by the first display device. The ready for pick-up alert includes a retrieval location associated with the one of the plurality of drop-off entities. In various embodiments, the item retrieval data further includes nearby drop-off entity data generated by the processing system in response to receiving the found item notification data, and sent to the second client device for display by the second display device. The nearby drop-off entity data includes a proximity-based proper subset of the plurality of registered drop-off entities selected by the processing system by comparing geospatial data received from the second client device to locations associated with the registered drop-off entities in response to receiving the found item notification data.

In various embodiments, the second interactive interface prompts the second user to take a photo of the first lost item using a camera coupled to the second client device. The photo is included in the found item notification data received from the second client device, and the photo is included in the found item alert data sent to the first client device for display to the first user by the first display device in conjunction with the display of the found item alert. In various embodiments, the item retrieval data further includes verification request data generated by the processing system in response to receiving the found item notification data, and sent to the first client device for display on the first display device prompting the first user to enter a response to a verification request. The item retrieval data also further includes verification response data received from the first client device via third user input that includes the response to the verification request entered by the first user. The verification response data is sent to the second client device for display on the second display device, prompting the second user to evaluate the response to the verification request. Verification confirmation data received from the second client device. The verification confirmation data is generated by the second client device in response to the verification request, and indicates that the first user successfully verified ownership of the first lost item.

In various embodiments, the item retrieval data further includes delivery drop-off request data generated by the processing system in response to receiving the found item notification data, and sent to the second client device for display by the second display device, prompting the second user to select a delivery pick-up location. The item retrieval data also further includes delivery pick-up selection data received from the second client device that includes the selected delivery pick-up location. The item retrieval data further includes delivery location request data generated by the processing system and sent to the first client device for display by the first display device, prompting the first user to enter a delivery drop-off location. The item retrieval data also further includes delivery drop-off selection data received from the first client device that includes the selected delivery drop-off location, and delivery instruction data generated by the processing system in response to receiving the delivery pick-up selection data and the delivery drop-off selection data, and sent to a third client device corresponding to a delivery service associated with the lost and found server. Delivery of the first lost item from the second user to the first user is facilitated by the delivery service based on delivery pick-up data and delivery drop-off data included in the delivery instruction data.

In various embodiments, the item retrieval data further includes notification preference menu data sent to the second client device for display by the second display device, prompting the second user to select at least one of a plurality of notification parameter options. The item retrieval data also further includes notification preference selection data received from the second client device that indicates the selected at least one of the plurality of notification parameter options. The proximity-based proper subset is further selected by the processing system based on a plurality of notification preferences corresponding to the plurality of users, and the second client device is included in the proximity-based proper subset further based on the notification preference selection data. In various embodiments, the notification preference selection data includes at least one of a plurality of lost item types selected by the second user, a distance range selected by the second user, and/or a time range selected by the second user. The second client device is included in the proximity-based proper subset in response to the selected at least one of the plurality of lost item types, the selected distance range, and/or the selected time range comparing favorably to the selected lost item type indicated by the lost item selection data received from the first client device, the selected lost item location indicated by the lost item selection data received from the first client device, and/or a time of recorded loss indicated by the lost item selection data received from the first client device. In various embodiments, the lost item selection data includes a reward value selected by the first user, and the notification preference selection data includes a lost item reward value range selected by the second user. The second client device is included in the proximity-based proper subset in response to the reward value selected by the first user comparing favorably to the lost item reward range selected by the second user.

In various embodiments, the lost item location data indicated by the lost item selection data includes a plurality of locations based on a transit route and/or a plurality of establishments, and the proximity-based proper subset is generated based on the plurality of locations. In various embodiments, the lost item location data indicated by the lost item selection data includes a plurality of loss likelihood weights corresponding to the plurality of locations, and the proximity-based proper subset is generated based on the loss likelihood weights and their corresponding location. In various embodiments, the first interactive interface further prompts the first user to upload a photo of the first lost item from a photo library associated with the first client device. The photo is included in the lost item selection data received from the first client device, and the photo is included in the lost item alert data sent to the proximity-based proper subset of the plurality of client devices for display to the corresponding subset of users in conjunction with display of each lost item alert.

In various embodiments, a plurality of lost item reports based on lost item selection data received from the plurality of client devices are stored in a lost item database in the memory. High-risk location data that includes plurality of high-risk locations is generated by the processing system based on lost item location data corresponding to the plurality of lost item reports, and a high-risk location alert is automatically generated by the processing system in response to receiving geospatial data from a third client device corresponding to one of the plurality of high-risk locations. The high-risk location alert is sent to the third client device for display automatically by a corresponding third display device alerting the user they entered a high-risk location.

In various embodiments, a plurality of found item reports that include found item location data and found item description data are received from plurality of client devices and are stored in a found item database in the memory. The item retrieval data further includes lost item search parameters received from a third client device in the plurality of client devices based on user input by a third user in the plurality of users attempting to recover a second lost item. The item retrieval data also further includes found item search results generated by the processing system based searching the found item database based on the lost item search parameters. The found item search results are sent to the third client device for display to the third user, indicating at least one of the plurality of found item reports of the found item database corresponding to at least one potential match. The item retrieval data also further includes lost item match data received from the third client device in response to the third user identifying a match to the second lost item in the found item search results, and found item claimed data automatically generated by the processing system in response to receiving the lost item match data and sent to a fourth client device associated with the match in the found item search results. The fourth client device automatically displays an item claimed alert on a fourth display device corresponding to the fourth client device indicating that the third user claimed the corresponding found item.

In various embodiments, a plurality of lost item reports that include lost item location data and lost item description data are received from plurality of client devices and are stored in a lost item database in the memory. The item retrieval data further includes a lost item database stored in the memory that includes a plurality of lost items based on lost item description data received from at least one of the plurality of client devices. The item retrieval data also further includes found item search parameters received from a third client device based on user input by a third user in conjunction with finding a potentially lost item, and lost item search results generated by the processing system based searching the lost item database based on the found item search parameters. The lost item search results are sent to the third client device for display to the third user, indicating at least one of the plurality of lost item reports of the lost item database corresponding to at least one potential match. The item retrieval data also further includes found item match data received from the third client device indicating a match identified by the third user in the lost item search results, and lost item recovered alert data automatically generated by the processing system in response to receiving the found item match data and sent to a fourth client device associated with the match in the lost item search results. The fourth client device automatically displays a found item alert on a fourth display device corresponding to the fourth client device indicating that the corresponding lost item was recovered by the third user in response to receiving the lost item matched data.

Figure 8:
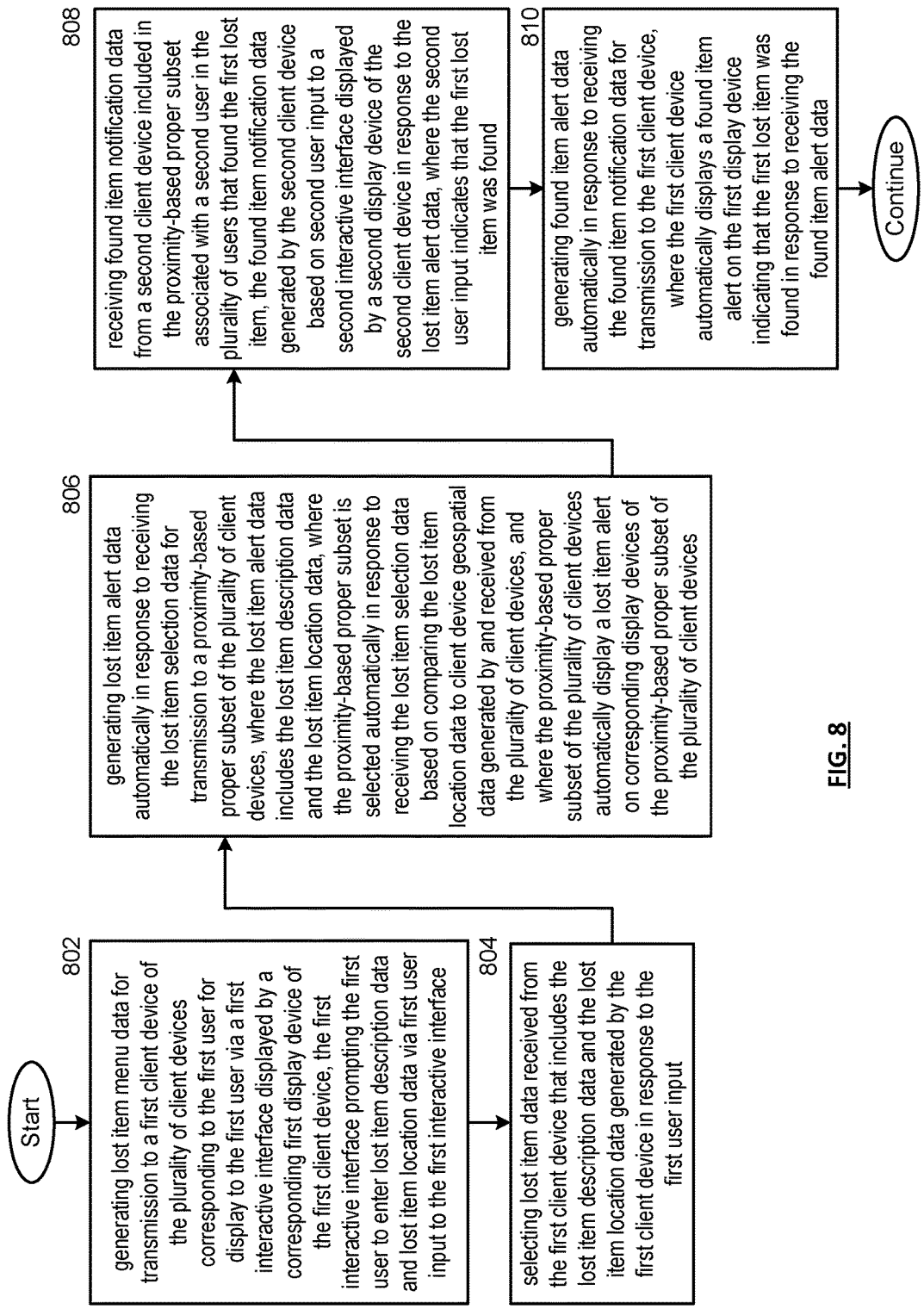
FIG. 8 is a flowchart representation of a method in accordance with an embodiment of the present invention.

FIG. 8 is a flowchart illustrating an example of retrieving a lost item. In particular, a method is presented for use in conjunction with one or more functions and features described in conjunction with FIGS. 1-7 for execution by a lost and found server that includes at least one processor and memory that stores instructions that configure the processor or processors to perform the steps described below. Step 802 includes generating lost item menu data for transmission to a first client device of the plurality of client devices corresponding to the first user for display to the first user via a first interactive interface displayed by a corresponding first display device of the first client device, the first interactive interface prompting the first user to enter lost item description data and lost item location data via first user input to the first interactive interface. Step 804 includes selecting lost item data received from the first client device that includes the lost item description data and the lost item location data generated by the first client device in response to the first user input. Step 806 includes generating lost item alert data automatically in response to receiving the lost item selection data for transmission to a proximity-based proper subset of the plurality of client devices, where the lost item alert data includes the lost item description data and the lost item location data, where the proximity-based proper subset is selected automatically in response to receiving the lost item selection data based on comparing the lost item location data to client device geospatial data generated by and received from the plurality of client devices, and where the proximity-based proper subset of the plurality of client devices automatically display a lost item alert on corresponding display devices of the proximity-based proper subset of the plurality of client devices. Step 808 includes receiving found item notification data from a second client device included in the proximity-based proper subset associated with a second user in the plurality of users that found the first lost item, the found item notification data generated by the second client device based on second user input to a second interactive interface displayed by a second display device of the second client device in response to the lost item alert data, where the second user input indicates that the first lost item was found. Step 810 includes generating found item alert data automatically in response to receiving the found item notification data for transmission to the first client device, where the first client device automatically displays a found item alert on the first display device indicating that the first lost item was found in response to receiving the found item alert data.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may further be used herein, the term "associated with", includes direct and/or indirect coupling of separate items and/or one item being embedded within another item. As may still further be used herein, the term "automatically" refers to an action caused directly by a processor of a computer network in response to a triggering event and particularly without human interaction.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A lost and found server comprising:
   a network interface for communicating via a network;
   a memory that stores a lost and found server application;
   a processing system, coupled to the memory and the network interface, the processing system including at least one processor that executes the lost and found server application that bidirectionally communicates item retrieval data with a plurality of users of a plurality of client devices via the network interface in conjunction with recovery of a first lost item by first user in the plurality of users, wherein the item retrieval data includes:
   lost item menu data generated by the processing system and sent to a first client device of the plurality of client devices corresponding to the first user for display to the first user via a first interactive interface displayed by a corresponding first display device the first client device, the first interactive interface prompting the first user to enter lost item description data and lost item location data via first user input to the first interactive interface;
   lost item selection data received from the first client device that includes the lost item description data and the lost item location data generated by the first client device in response to the first user input;
   lost item alert data automatically generated by the processing system in response to receiving the lost item selection data and sent to a proximity-based proper subset of the plurality of client devices, wherein the lost item alert data includes the lost item description data and the lost item location data, wherein the proximity-based proper subset is selected by the processing system automatically in response to receiving the lost item selection data based on comparing the lost item location data to client device geospatial data generated by and received from the plurality of client devices, and wherein the proximity-based proper subset of the plurality of client devices automatically display a lost item alert on corresponding display devices of the proximity-based proper subset of the plurality of client devices;
   found item notification data received from a second client device included in the proximity-based proper subset associated with a second user in the plurality of users that found the first lost item, the found item notification data generated by the second client device based on second user input to a second interactive interface displayed by a second display device of the second client device in response to the lost item alert data, wherein the second user input indicates that the first lost item was found; and
   found item alert data automatically generated by the processing system in response to receiving the found item notification data and sent to the first client device, wherein the first client device automatically displays a found item alert on the first display device indicating that the first lost item was found in response to receiving the found item alert data.

2. The lost and found server of claim 1, wherein the found item notification data received from the second client device includes a retrieval location generated by the second client device in response to the second user input, wherein the found item alert data sent to the first client device includes retrieval instruction data generated by the processing system for display via the first display device, and wherein the retrieval instruction data includes the retrieval location generated by the second client device in response to the second user input.

3. The lost and found server of claim 2, wherein the second interactive interface prompts the second user to select the retrieval location via an interactive map displayed on the second display device.

4. The lost and found server of claim 2, wherein the found item notification data includes geospatial data generated by the second client device in response to the second user input indicating an option to set the retrieval location to their current location via the second interactive interface.

5. The lost and found server of claim 2, wherein the item retrieval data further includes:
   navigation data automatically generated by the processing system in response to receiving the found item notification data, and sent to the first client device for display by the first display device, wherein the navigation data is generated based on geospatial data received from the first client device and the retrieval location.

6. The lost and found server of claim 1, wherein the item retrieval data further includes:
   a found item drop-off notification received from a third client device associated with one of a plurality of registered drop-off entities indicating that the first lost item was dropped-off at the one of the plurality of registered drop-off entities; and
   a ready for pick-up alert generated by the processing system in response to receiving the found item drop-off notification, and sent to the first client device for display by the first display device, wherein the ready for pick-up alert includes a retrieval location associated with the one of the plurality of registered drop-off entities.

7. The lost and found server of claim 6, wherein the item retrieval data further includes:
nearby drop-off entity data generated by the processing system in response to receiving the found item notification data, and sent to the second client device for display by the second display device, wherein the nearby drop-off entity data includes a proximity-based proper subset of the plurality of registered drop-off entities selected by the processing system by comparing geospatial data received from the second client device to locations associated with the registered drop-off entities in response to receiving the found item notification data.

8. The lost and found server of claim 1, wherein the second interactive interface prompts the second user to take a photo of the first lost item using a camera coupled to the second client device, wherein the photo is included in the found item notification data received from the second client device, and wherein the photo is included in the found item alert data sent to the first client device for display to the first user by the first display device in conjunction with the display of the found item alert.

9. The lost and found server of claim 1, wherein the item retrieval data further includes:
verification request data generated by the processing system in response to receiving the found item notification data, and sent to the first client device for display on the first display device prompting the first user to enter a response to a verification request;
verification response data received from the first client device via third user input that includes the response to the verification request entered by the first user, wherein the verification response data is sent to the second client device for display on the second display device, prompting the second user to evaluate the response to the verification request; and
verification confirmation data received from the second client device, the verification confirmation data generated by the second client device in response to the verification request, the verification confirmation data indicating that the first user successfully verified ownership of the first lost item.

10. The lost and found server of claim 1, wherein the item retrieval data further includes:
delivery drop-off request data generated by the processing system in response to receiving the found item notification data, and sent to the second client device for display by the second display device, prompting the second user to select a delivery pick-up location;
delivery pick-up selection data received from the second client device that includes the selected delivery pick-up location;
delivery location request data generated by the processing system and sent to the first client device for display by the first display device, prompting the first user to enter a delivery drop-off location;
delivery drop-off selection data received from the first client device that includes the selected delivery drop-off location; and
delivery instruction data generated by the processing system in response to receiving the delivery pick-up selection data and the delivery drop-off selection data, and sent to a third client device corresponding to a delivery service associated with the lost and found server, wherein delivery of the first lost item from the second user to the first user is facilitated by the delivery service based on delivery pick-up data and delivery drop-off data included in the delivery instruction data.

11. The lost and found server of claim 1, wherein the item retrieval data further includes:
notification preference menu data sent to the second client device for display by the second display device, prompting the second user to select at least one of a plurality of notification parameter options; and
notification preference selection data received from the second client device that indicates the selected at least one of the plurality of notification parameter options;
wherein the proximity-based proper subset is further selected by the processing system based on a plurality of notification preferences corresponding to the plurality of users, and wherein the second client device is included in the proximity-based proper subset further based on the notification preference selection data.

12. The lost and found server of claim 11, wherein the notification preference selection data includes at least one of: at least one of a plurality of lost item types selected by the second user, a distance range selected by the second user, or a time range selected by the second user, and wherein the second client device is included in the proximity-based proper subset in response to the at least one of: the selected at least one of the plurality of lost item types, the selected distance range, or the selected time range comparing favorably to at least one of: the selected lost item type indicated by the lost item selection data received from the first client device, the selected lost item location indicated by the lost item selection data received from the first client device, or a time of recorded loss indicated by the lost item selection data received from the first client device.

13. The lost and found server of claim 11, wherein the lost item selection data includes a reward value selected by the first user, wherein the notification preference selection data includes a lost item reward value range selected by the second user, and wherein the second client device is included in the proximity-based proper subset in response to the reward value selected by the first user comparing favorably to the lost item reward value range selected by the second user.

14. The lost and found server of claim 1, wherein the lost item location data indicated by the lost item selection data includes a plurality of locations based on at least one of: a transit route or a plurality of establishments, and wherein the proximity-based proper subset is generated based on the plurality of locations.

15. The lost and found server of claim 14, wherein the lost item location data indicated by the lost item selection data includes a plurality of loss likelihood weights corresponding to the plurality of locations, and wherein the proximity-based proper subset is generated based on the loss likelihood weights and their corresponding location.

16. The lost and found server of claim 1, wherein the first interactive interface further prompts the first user to upload a photo of the first lost item from a photo library associated with the first client device, wherein the photo is included in the lost item selection data received from the first client device, and wherein the photo is included in the lost item alert data sent to the proximity-based proper subset of the plurality of client devices for display to the corresponding subset of users in conjunction with display of each lost item alert.

17. The lost and found server of claim 1, wherein a plurality of lost item reports based on lost item selection data received from the plurality of client devices are stored in a lost item database in the memory, wherein high-risk location data that includes plurality of high-risk locations is generated by the processing system based on lost item location data corresponding to the plurality of lost item reports, and wherein a high-risk location alert is automatically generated by the processing system in response to receiving geospatial data from a third client device corresponding to one of the plurality of high-risk locations, and wherein the high-risk location alert is sent to the third client device for display automatically by a corresponding third display device alerting the user they entered a high-risk location.

18. The lost and found server of claim 1, wherein a plurality of found item reports that include found item location data and found item description data are received from plurality of client devices and are stored in a found item database in the memory, and wherein the item retrieval data further includes:
  lost item search parameters received from a third client device in the plurality of client devices based on user input by a third user in the plurality of users attempting to recover a second lost item;
  found item search results generated by the processing system based searching the found item database based on the lost item search parameters, wherein the found item search results are sent to the third client device for display to the third user, indicating at least one of the plurality of found item reports of the found item database corresponding to at least one potential match;
  lost item match data received from the third client device in response to the third user identifying a match to the second lost item in the found item search results; and
  found item claimed data automatically generated by the processing system in response to receiving the lost item match data and sent to a fourth client device associated with the match in the found item search results, wherein the fourth client device automatically displays an item claimed alert on a fourth display device corresponding to the fourth client device indicating that the third user claimed the corresponding found item.

19. The lost and found server of claim 1, wherein a plurality of lost item reports that include lost item location data and lost item description data are received from plurality of client devices and are stored in a lost item database in the memory, and wherein the item retrieval data further includes:
  a lost item database stored in the memory that includes a plurality of lost items based on lost item description data received from at least one of the plurality of client devices;
  found item search parameters received from a third client device based on user input by a third user in conjunction with finding a potentially lost item;
  lost item search results generated by the processing system based searching the lost item database based on the found item search parameters, wherein the lost item search results are sent to the third client device for display to the third user, indicating at least one of the plurality of lost item reports of the lost item database corresponding to at least one potential match;
  found item match data received from the third client device indicating a match identified by the third user in the lost item search results; and
  lost item recovered alert data automatically generated by the processing system in response to receiving the found item match data and sent to a fourth client device associated with the match in the lost item search results, wherein the fourth client device automatically displays a found item alert on a fourth display device corresponding to the fourth client device indicating that the corresponding lost item was recovered by the third user in response to receiving the lost item matched data.

20. A method for execution by a lost and found server that includes a processor, the method comprises:
  generating lost item menu data for transmission to a first client device of a plurality of client devices corresponding to a first user for display to the first user via a first interactive interface displayed by a corresponding first display device of the first client device, the first interactive interface prompting the first user to enter lost item description data and lost item location data via first user input to the first interactive interface;
  selecting lost item data received from the first client device that includes the lost item description data and the lost item location data generated by the first client device in response to the first user input;
  generating lost item alert data automatically in response to receiving the lost item selection data for transmission to a proximity-based proper subset of the plurality of client devices, wherein the lost item alert data includes the lost item description data and the lost item location data, wherein the proximity-based proper subset is selected automatically in response to receiving the lost item selection data based on comparing the lost item location data to client device geospatial data generated by and received from the plurality of client devices, and wherein the proximity-based proper subset of the plurality of client devices automatically display a lost item alert on corresponding display devices of the proximity-based proper subset of the plurality of client devices;
  receiving found item notification data from a second client device included in the proximity-based proper subset associated with a second user in the plurality of users that found the first lost item, the found item notification data generated by the second client device based on second user input to a second interactive interface displayed by a second display device of the second client device in response to the lost item alert data, wherein the second user input indicates that the first lost item was found; and
  generating found item alert data automatically in response to receiving the found item notification data for transmission to the first client device, wherein the first client device automatically displays a found item alert on the first display device indicating that the first lost item was found in response to receiving the found item alert data.

* * * * *